Nov. 1, 1927.
G. W. SWIFT, JR
1,647,379
CAP MAKING MACHINE
Filed Oct. 27, 1926 20 Sheets-Sheet 1
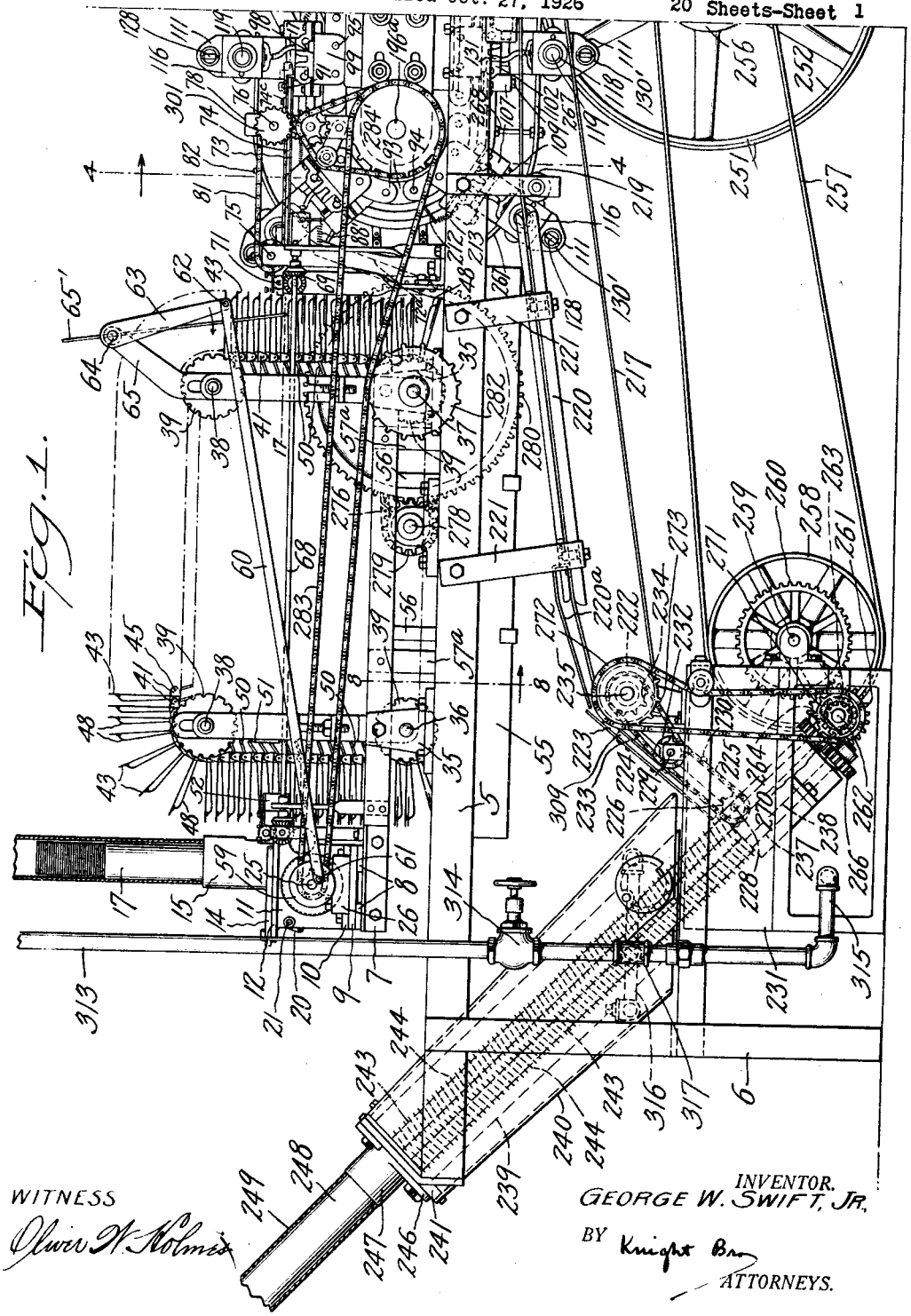
WITNESS
INVENTOR.
GEORGE W. SWIFT, JR.
BY Knight Bros
ATTORNEYS.

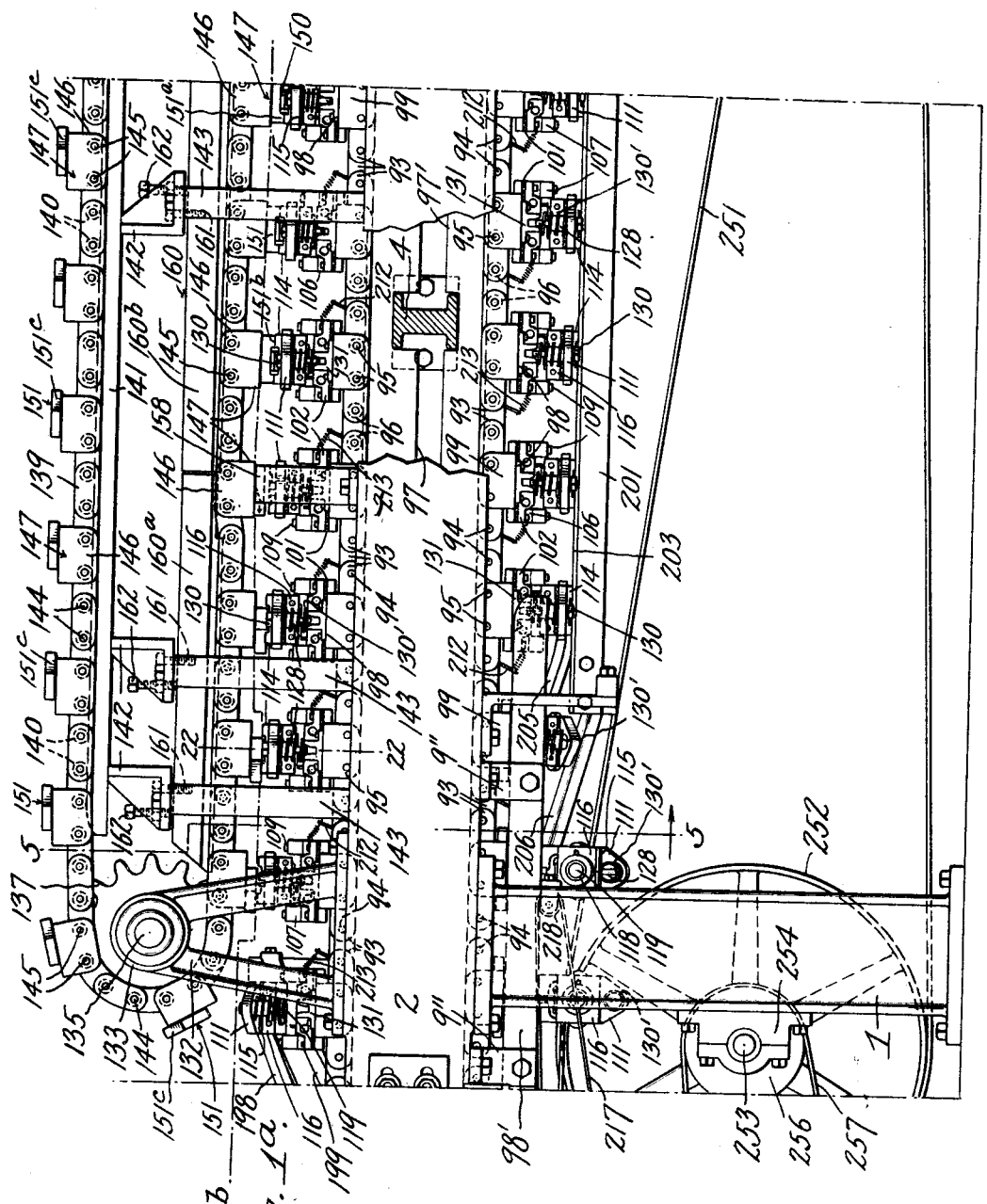

Nov. 1, 1927.
G. W. SWIFT, JR
1,647,379
CAP MAKING MACHINE
Filed Oct. 27, 1926
20 Sheets-Sheet 3
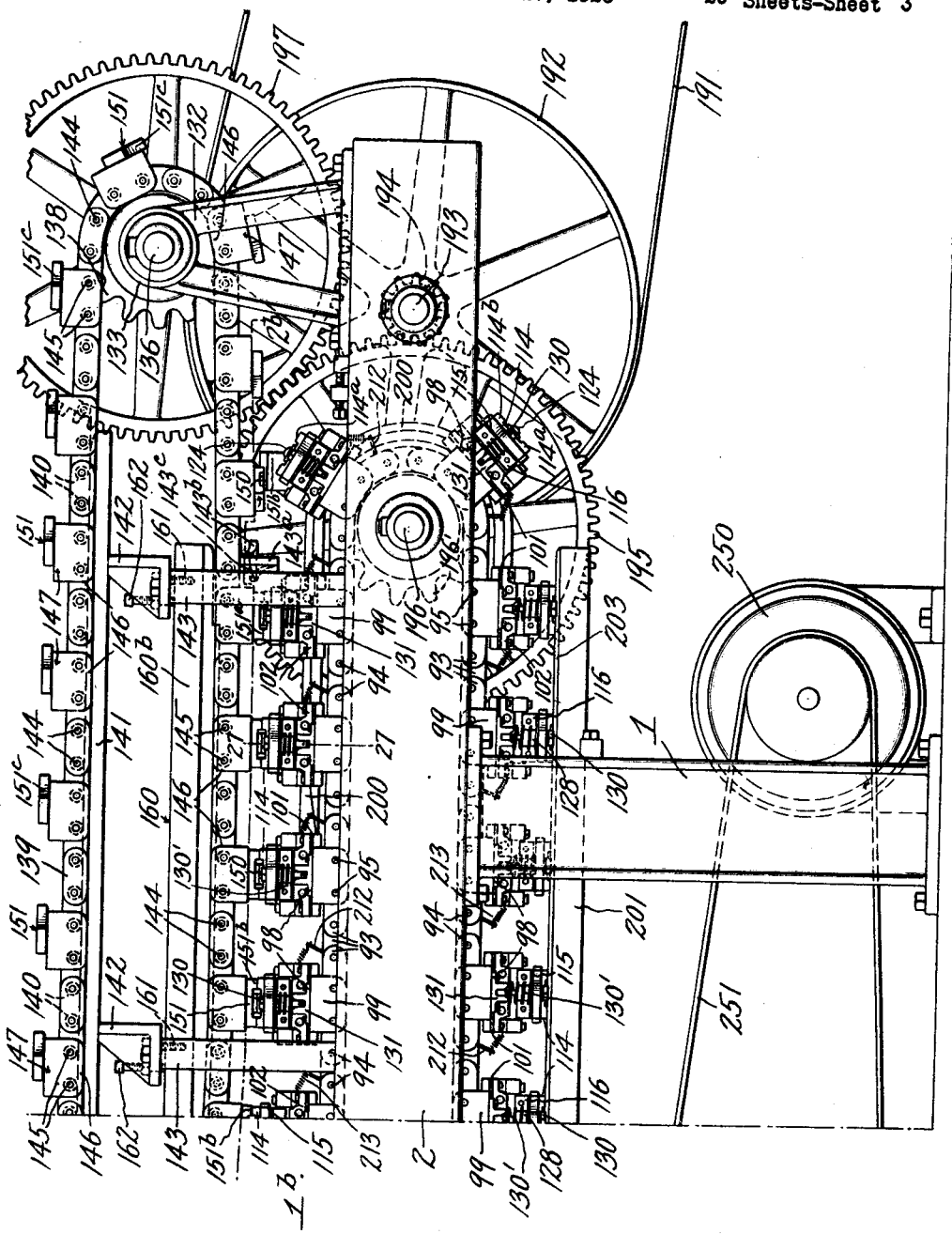
WITNESS
Oliver W. Holmes
INVENTOR.
GEORGE W. SWIFT, JR.
BY Knight Bro
ATTORNEYS.

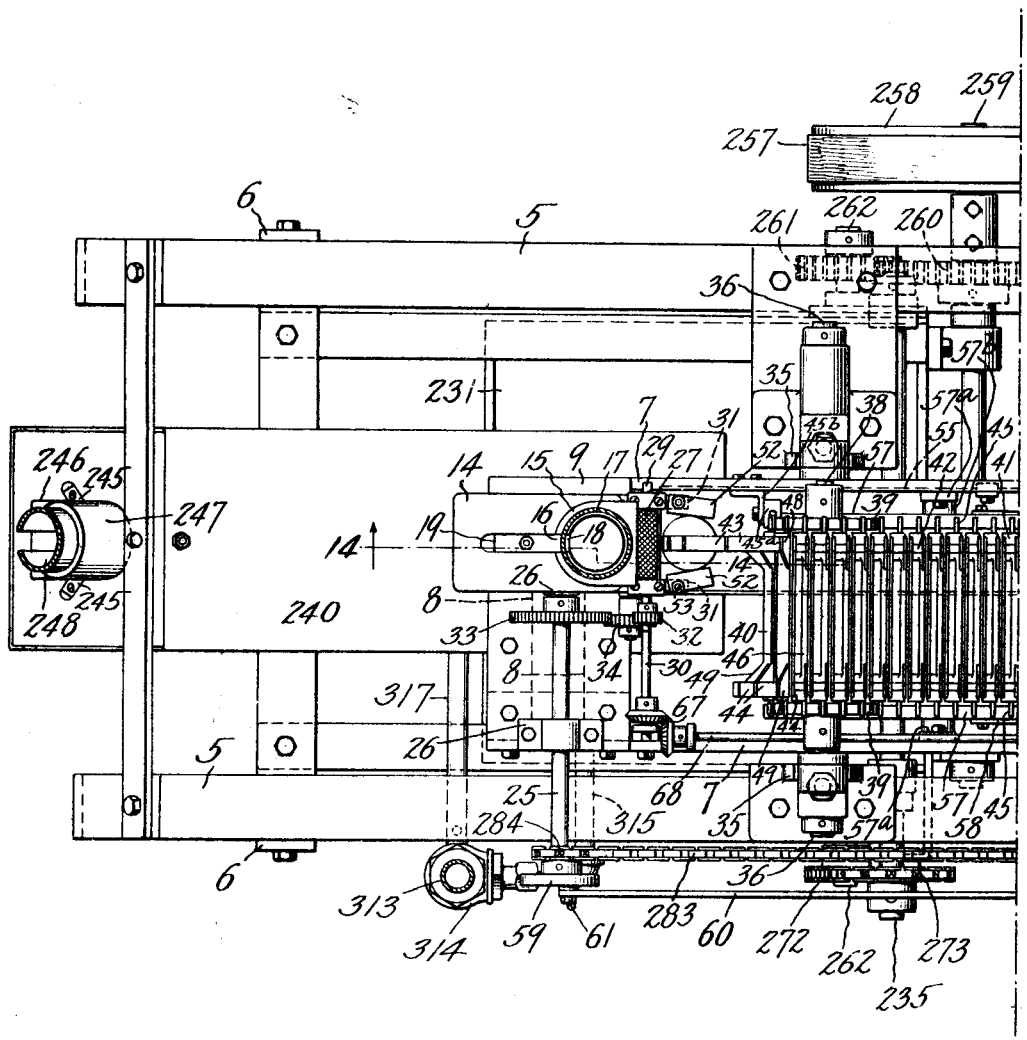

Nov. 1, 1927.

G. W. SWIFT, JR 1,647,379

CAP MAKING MACHINE

Filed Oct. 27, 1926   20 Sheets-Sheet 5

Fig. 2a.

INVENTOR.
GEORGE W. SWIFT, JR,
BY
ATTORNEYS.

WITNESS

Fig. 2b.

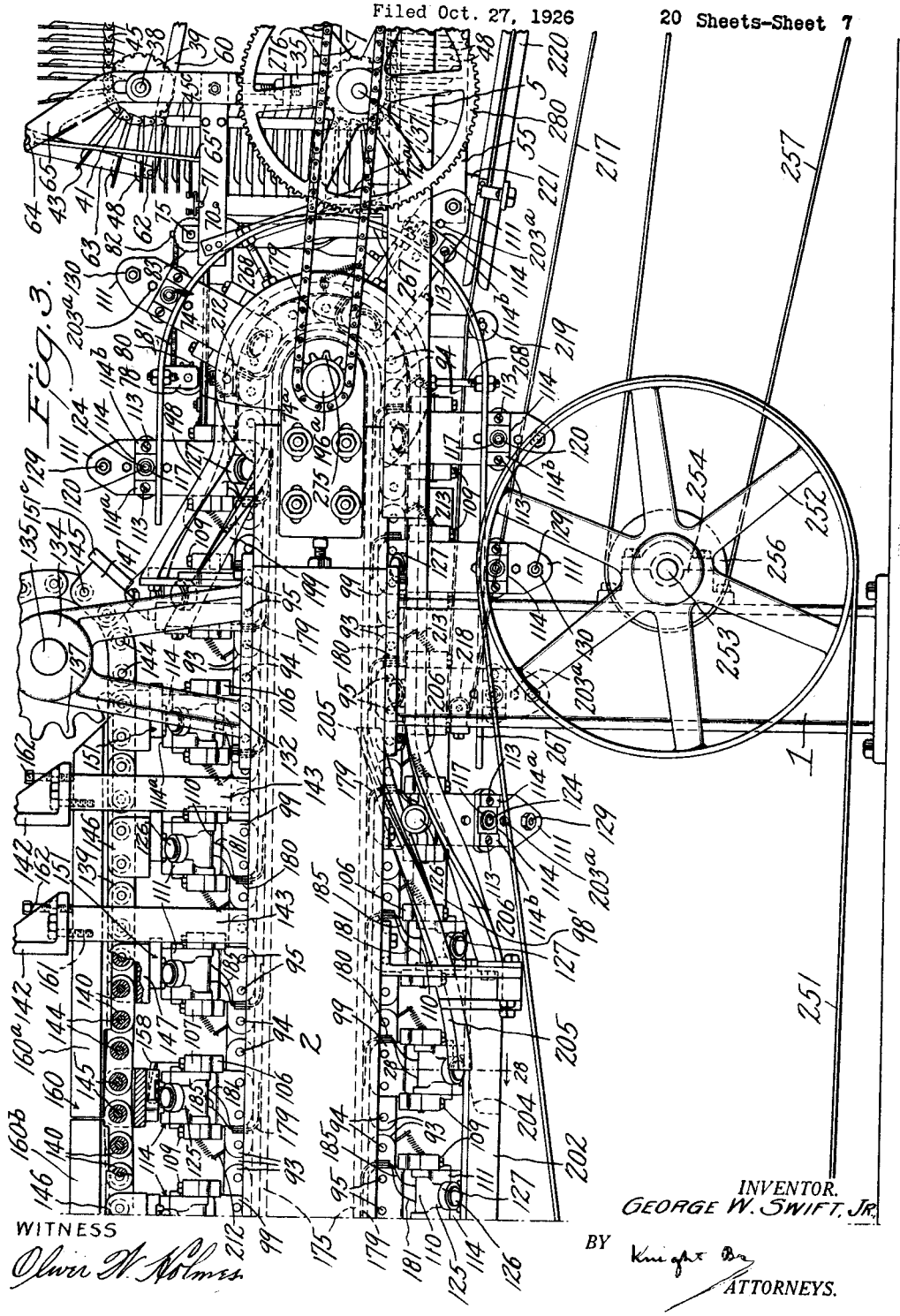

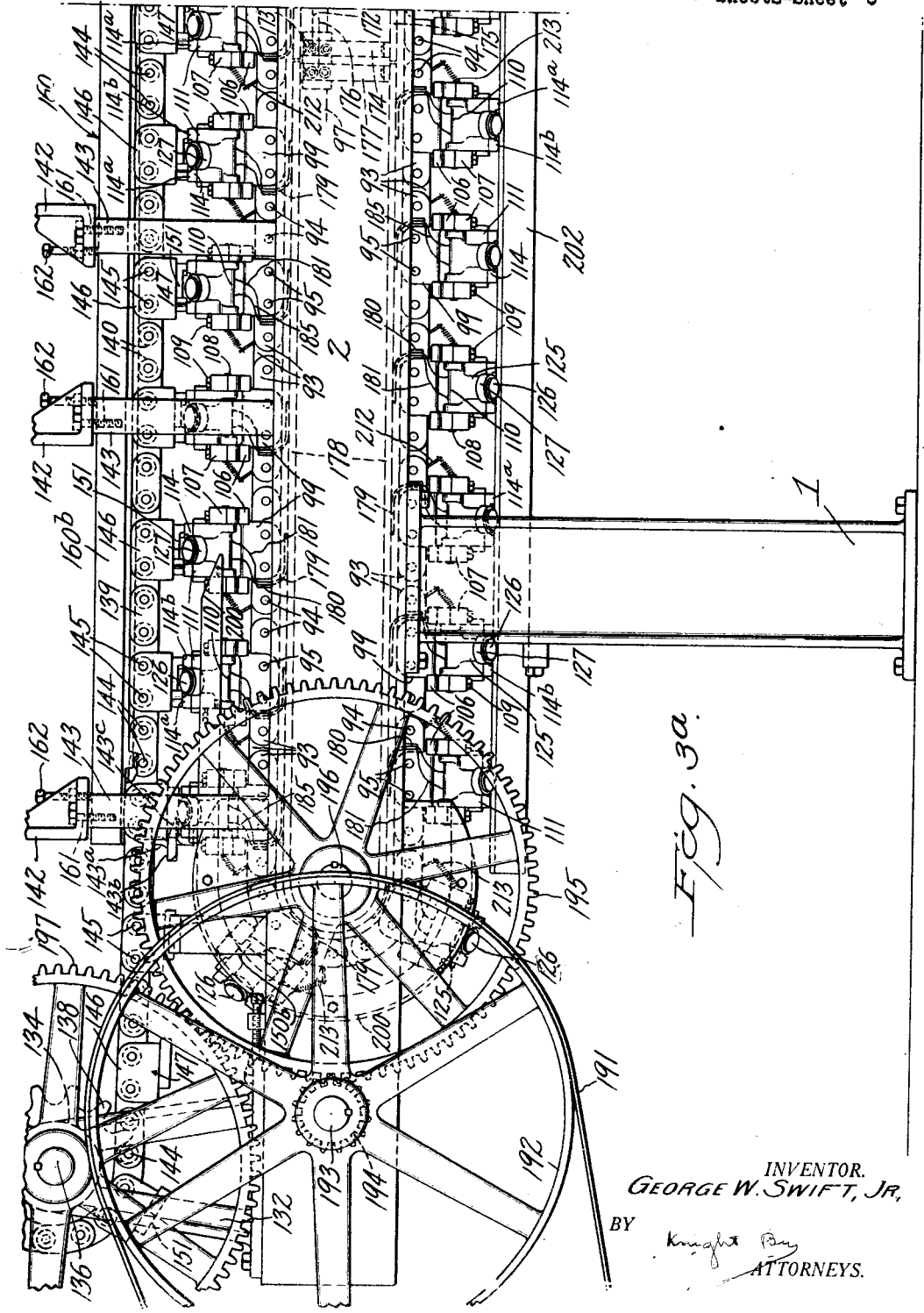

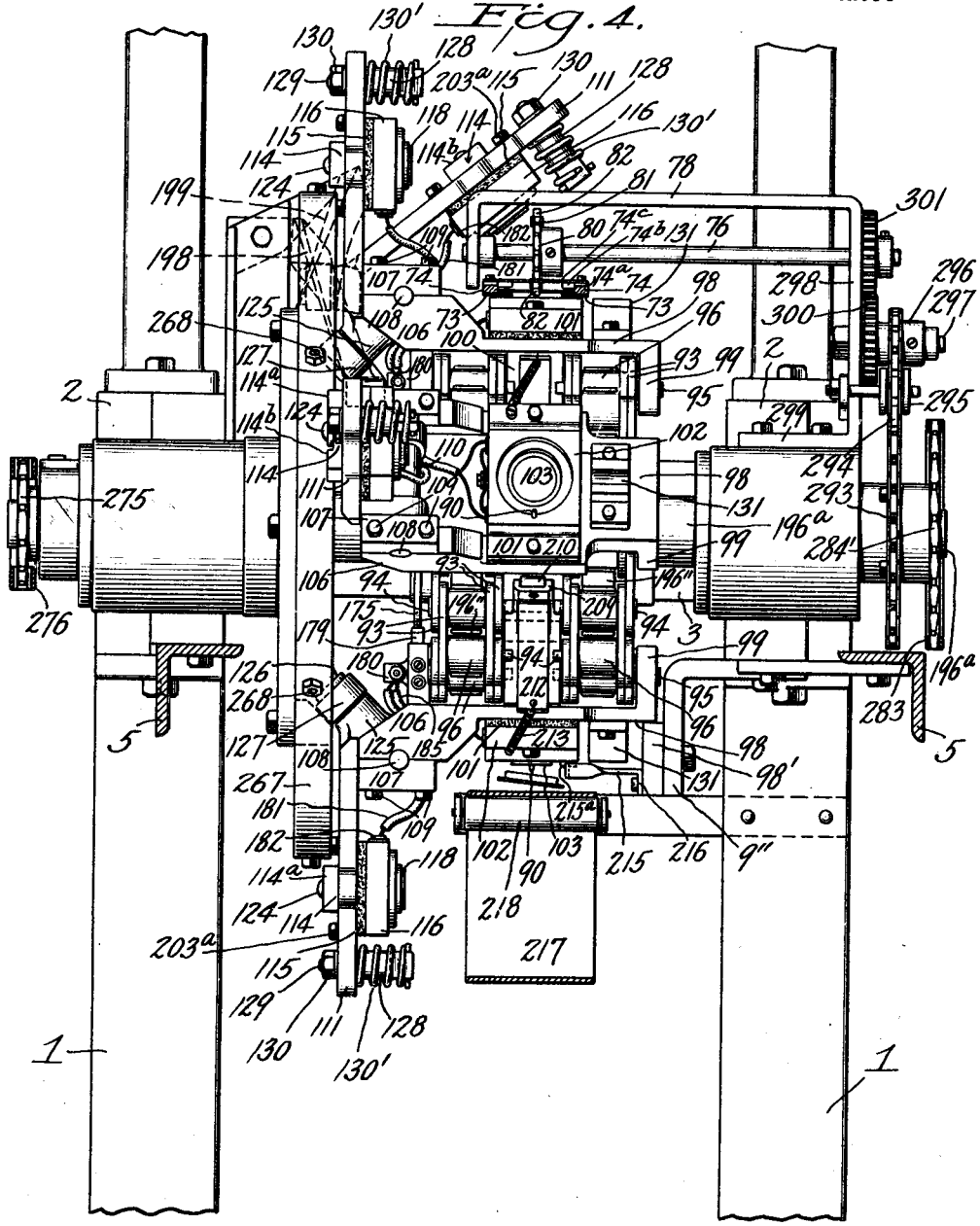

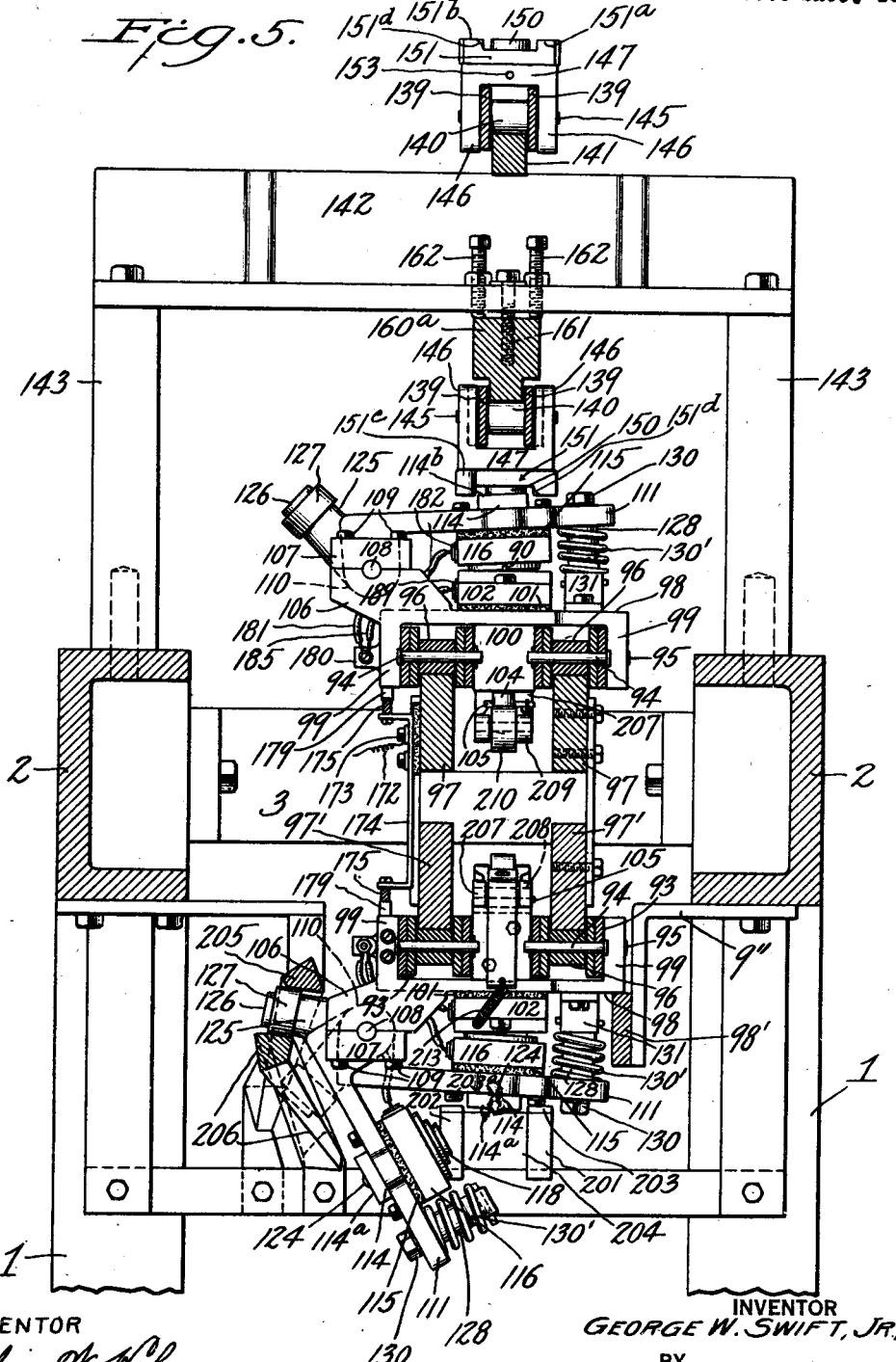

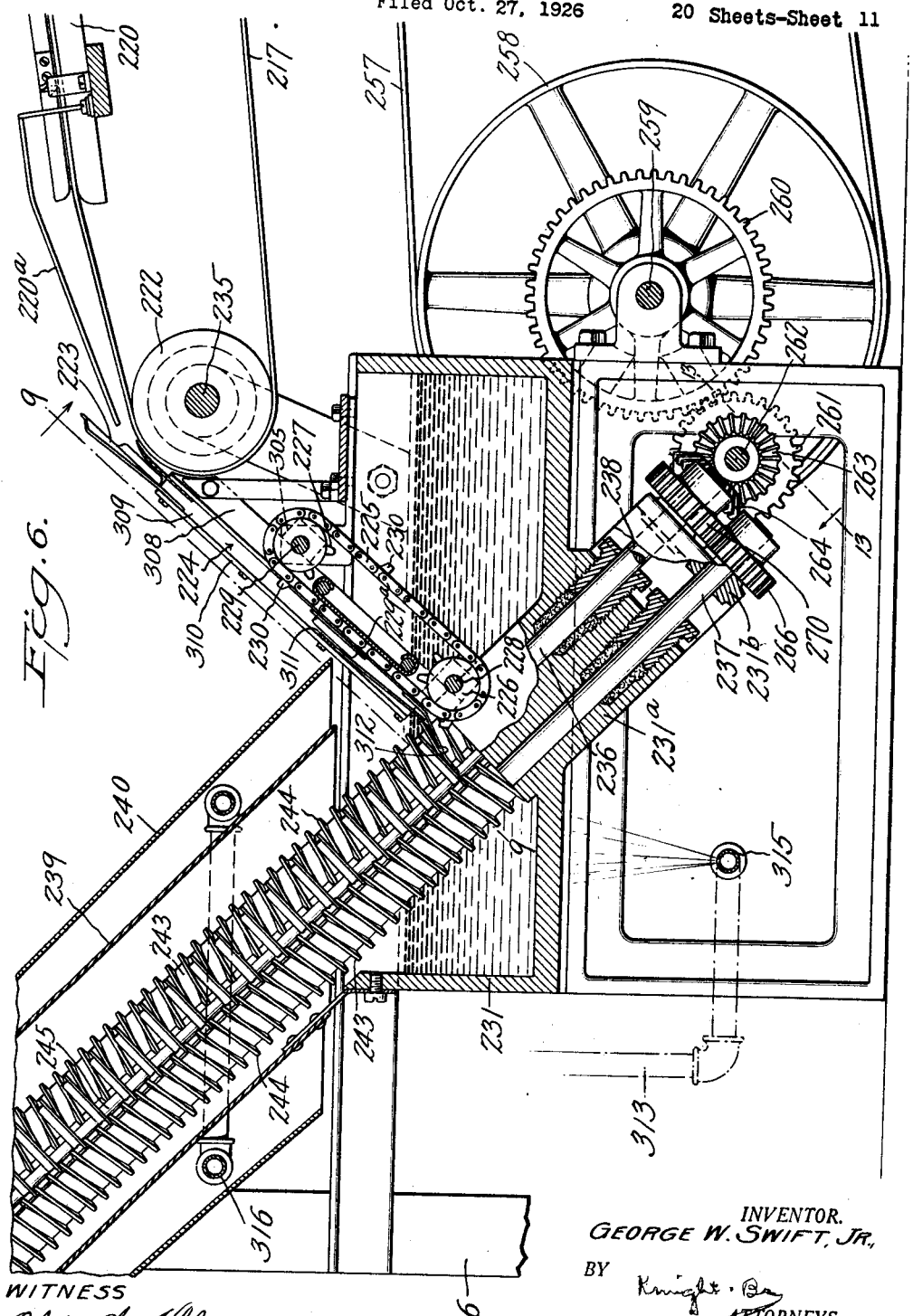

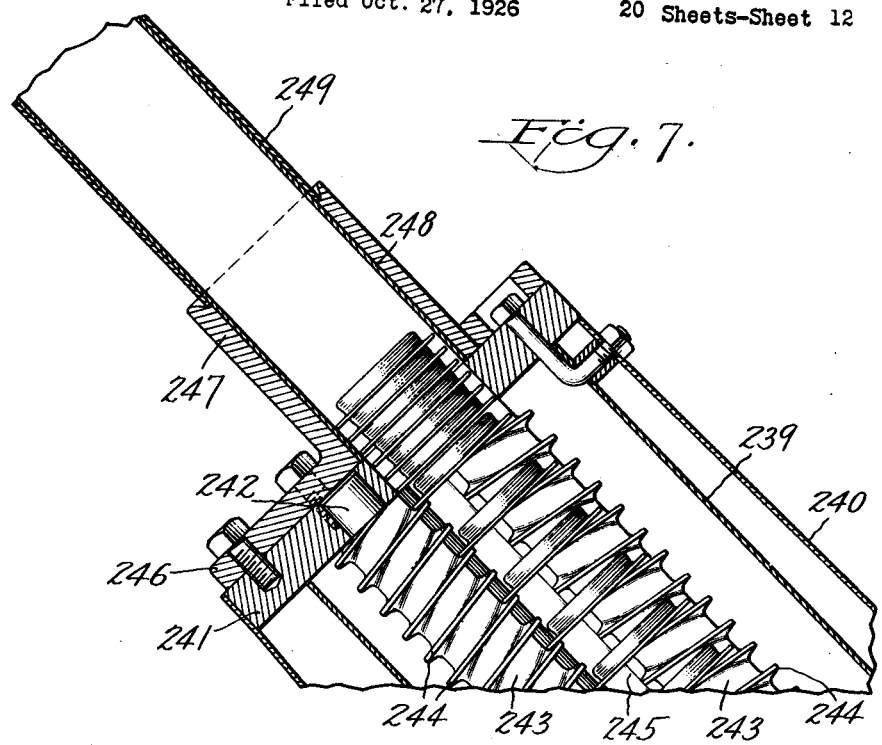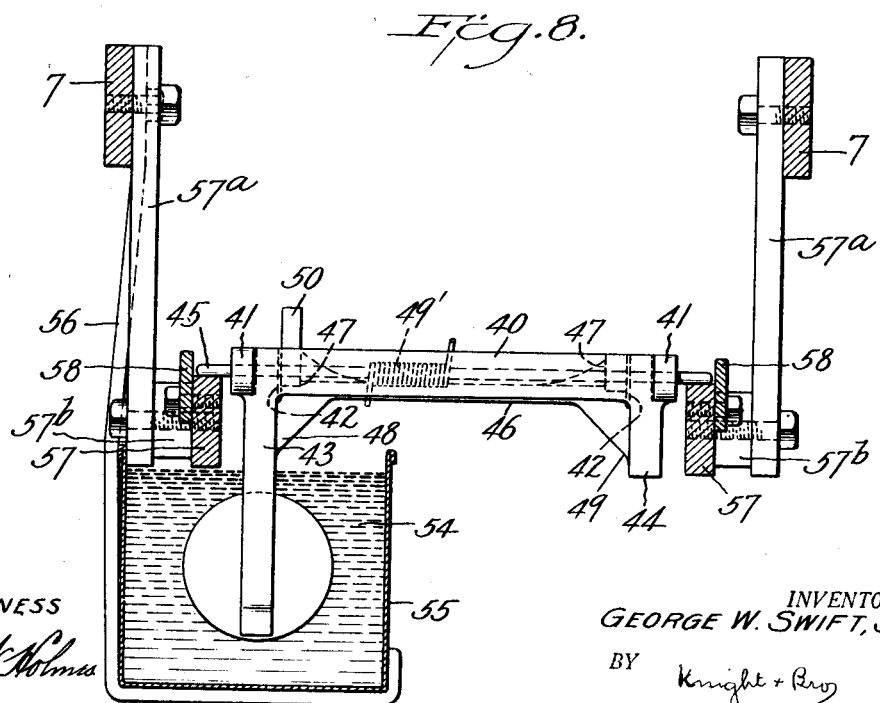

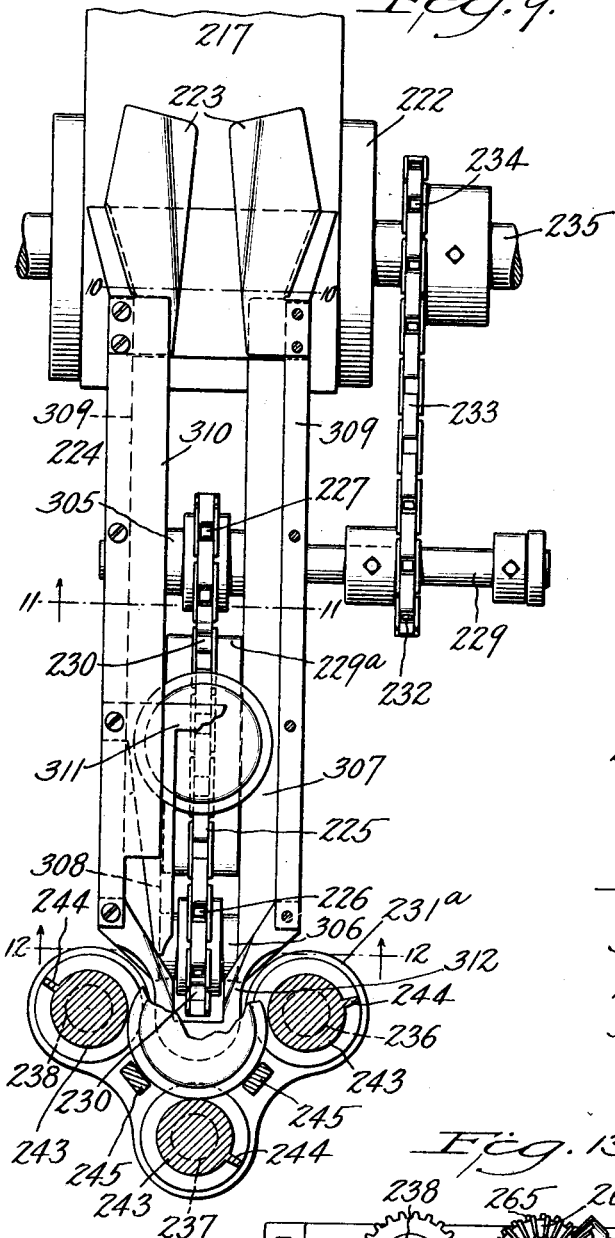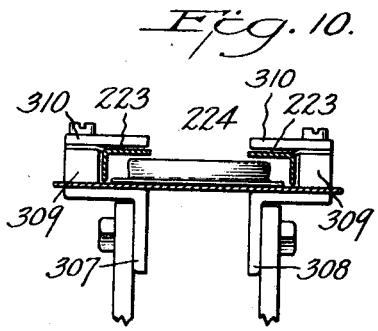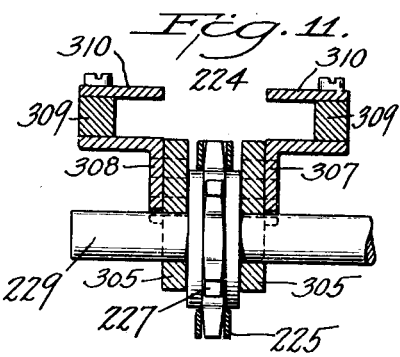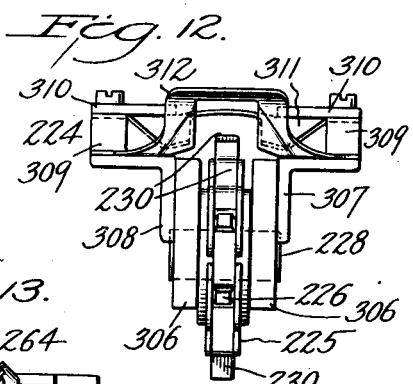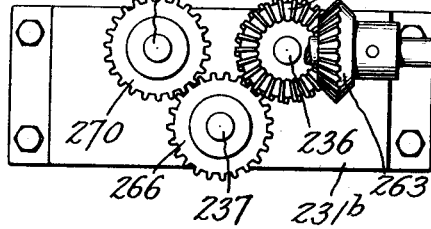

Nov. 1, 1927.
G. W. SWIFT, JR
1,647,379
CAP MAKING MACHINE
Filed Oct. 27, 1926 20 Sheets-Sheet 14
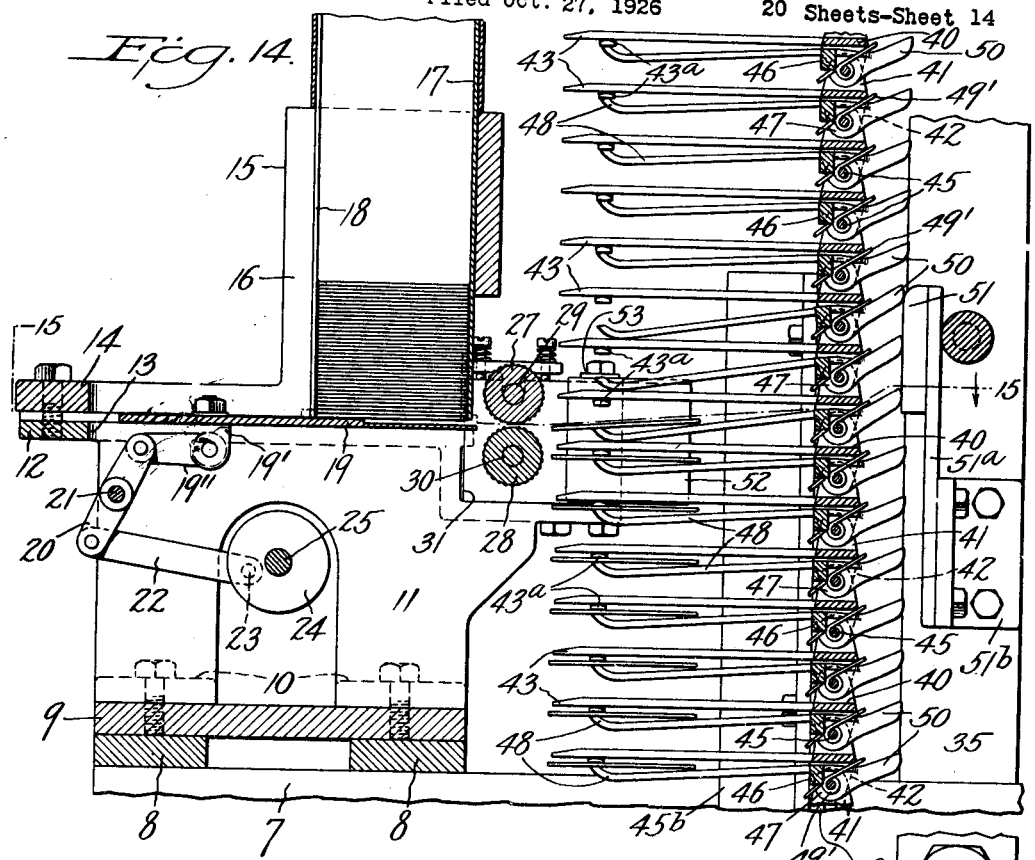
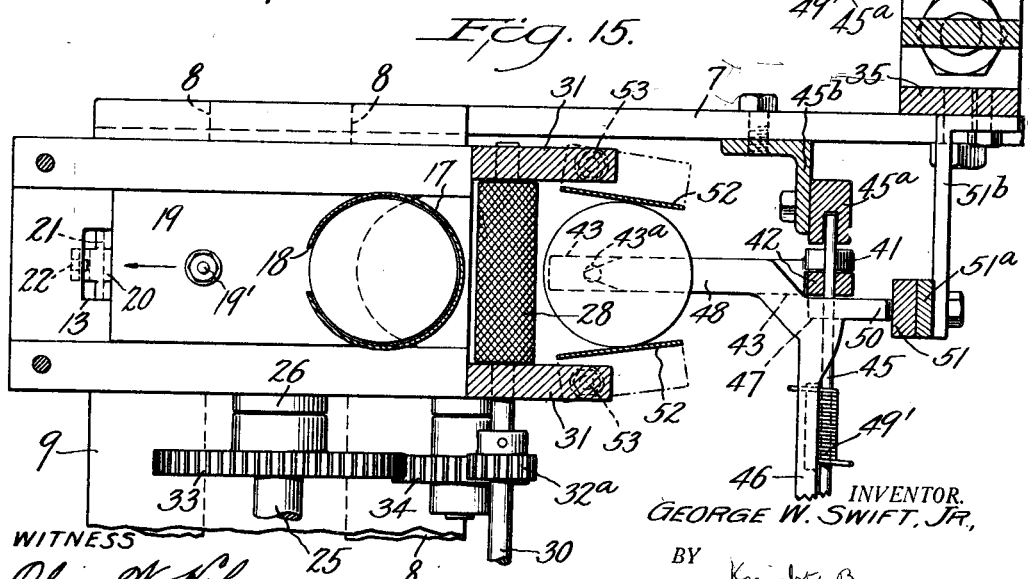
INVENTOR.
GEORGE W. SWIFT, JR,
BY Knight Bury
ATTORNEYS.
WITNESS
Oliver W. Holmes

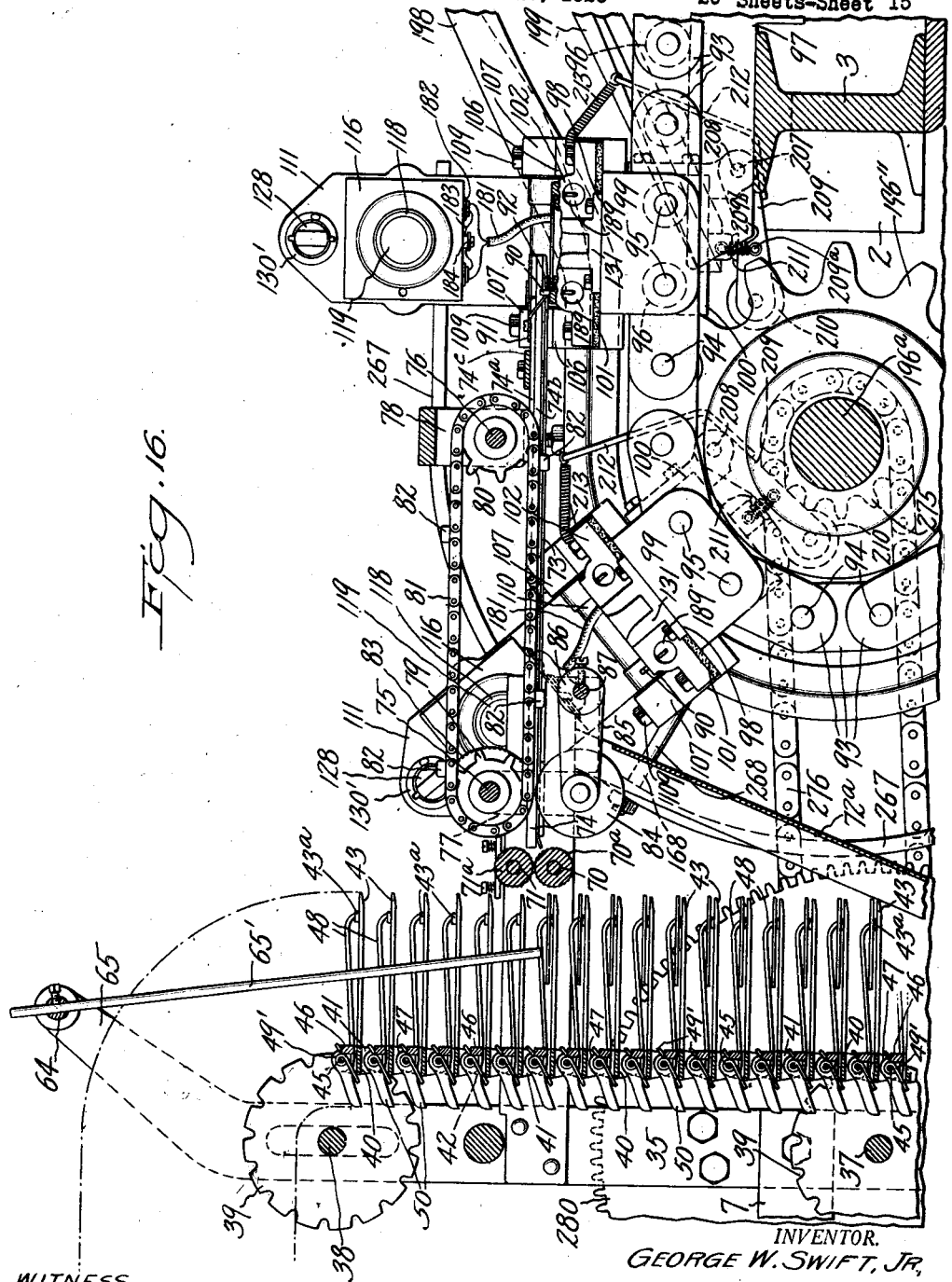

Nov. 1, 1927.
G. W. SWIFT, JR
1,647,379
CAP MAKING MACHINE
Filed Oct. 27, 1926
20 Sheets-Sheet 16
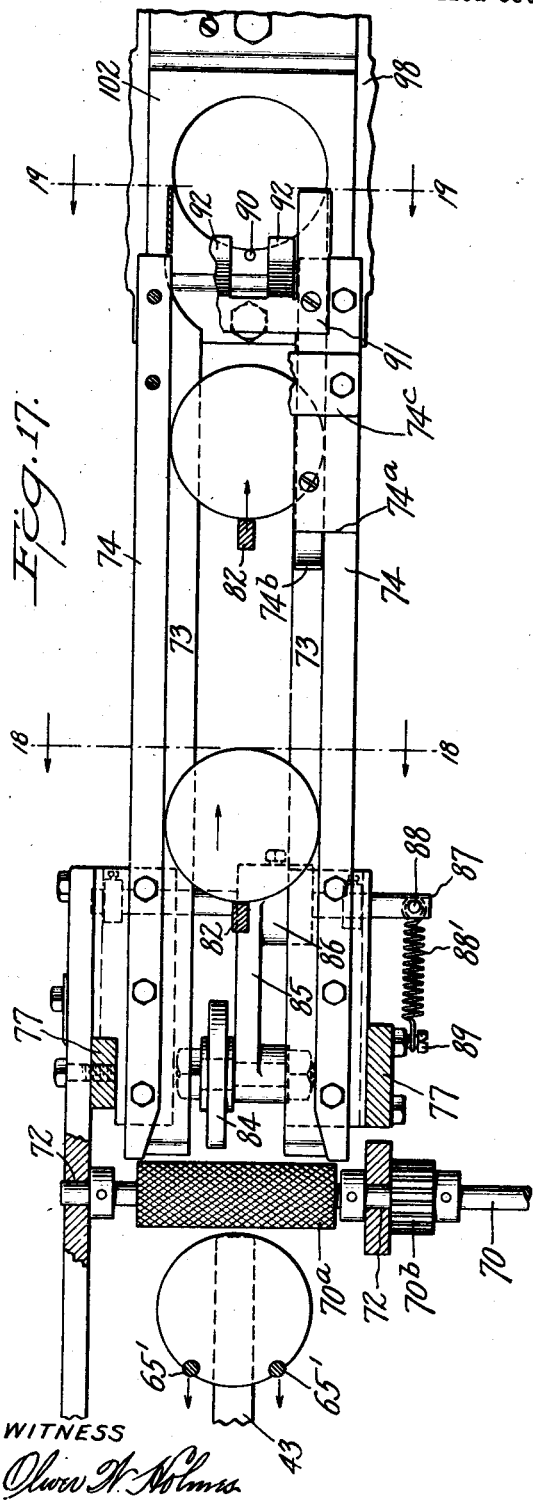
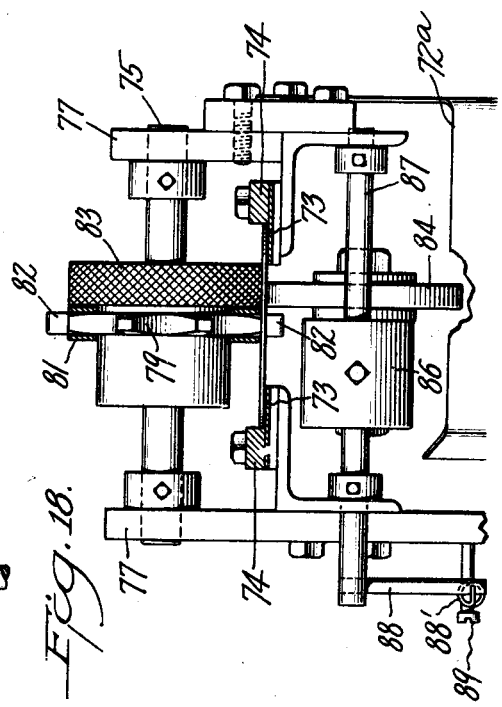
INVENTOR
GEORGE W. SWIFT, JR.
BY 
ATTORNEYS.
WITNESS

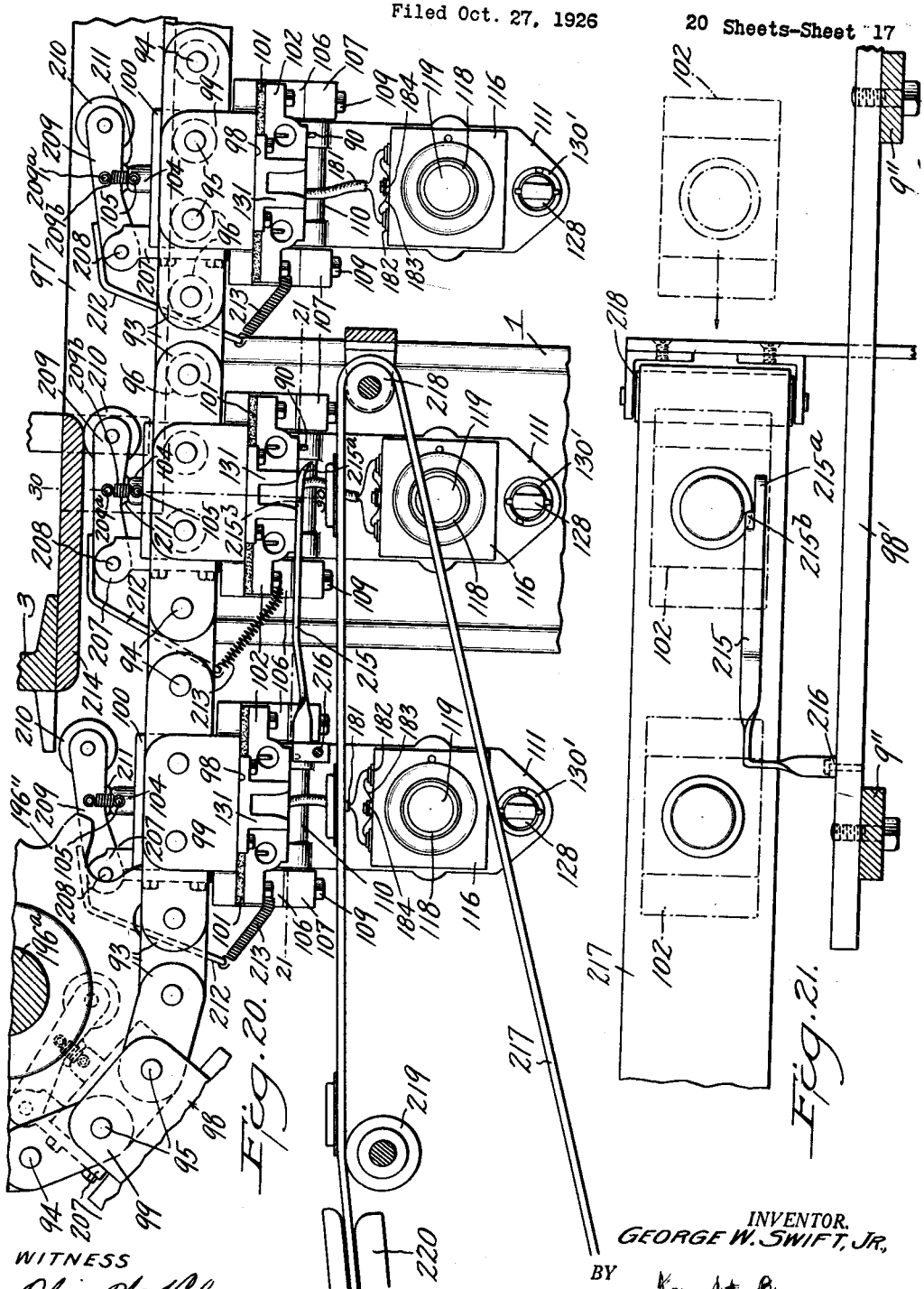

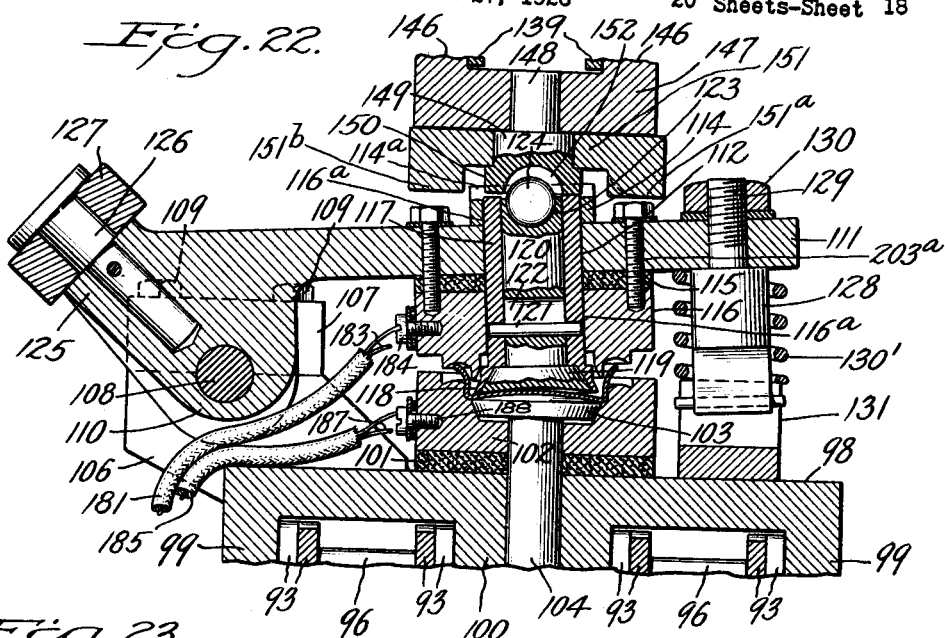

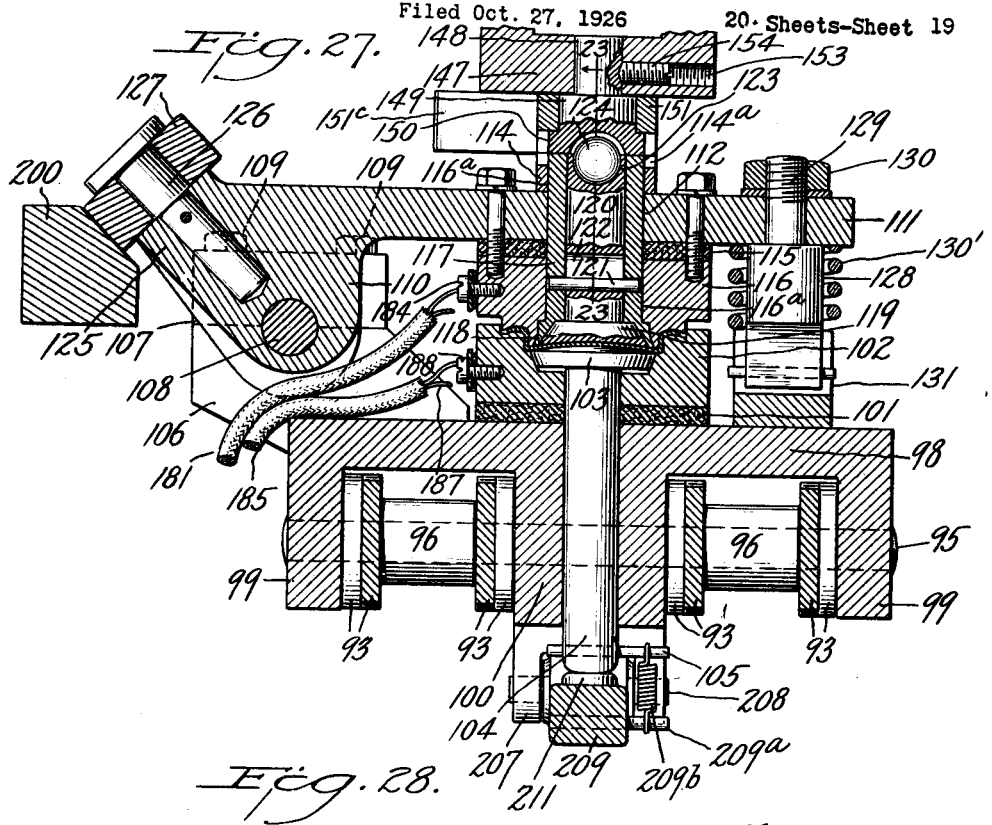

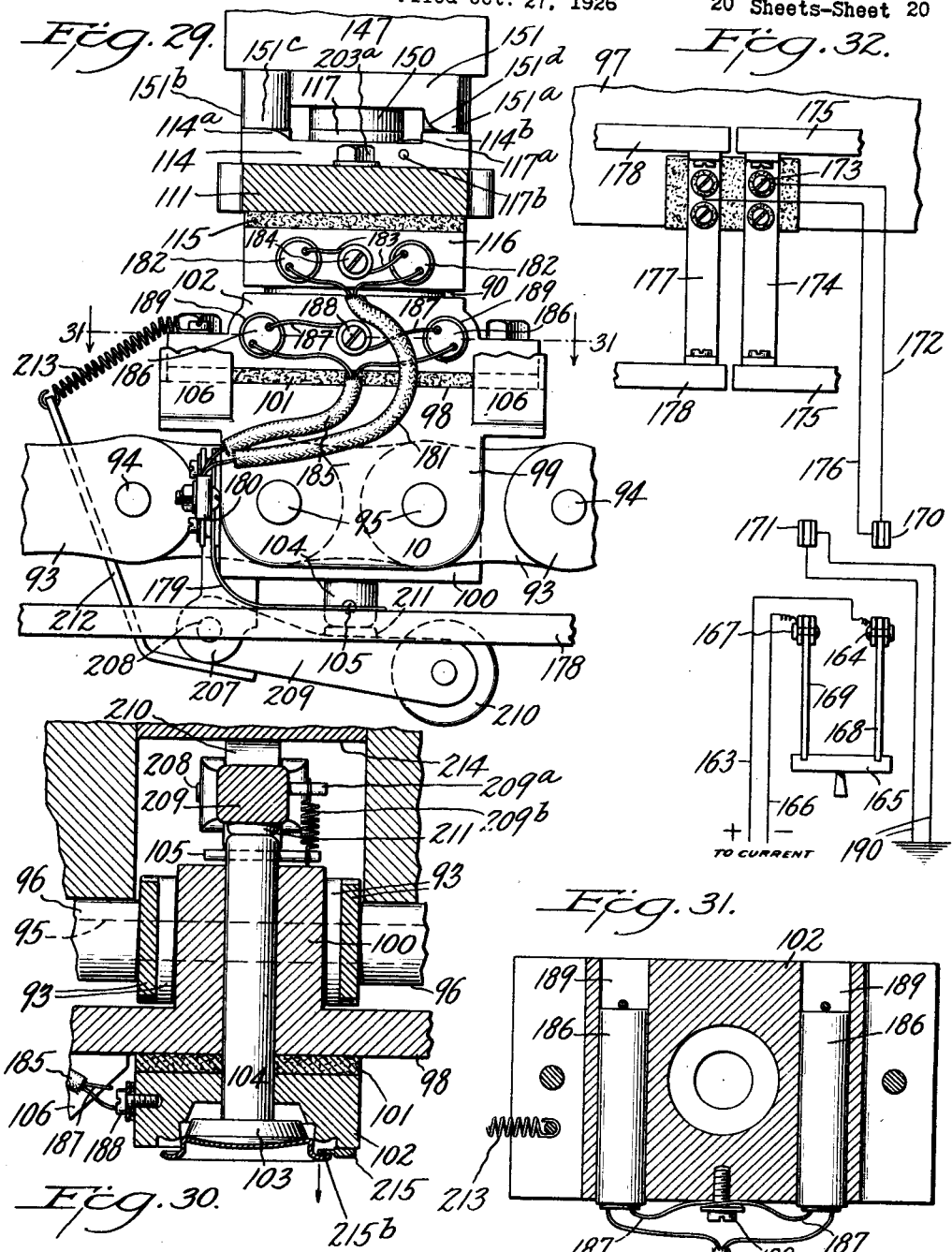

Patented Nov. 1, 1927.

1,647,379

UNITED STATES PATENT OFFICE.

GEORGE W. SWIFT, JR., OF BORDENTOWN, NEW JERSEY, ASSIGNOR TO GEORGE W. SWIFT, JR., INC., OF BORDENTOWN, NEW JERSEY, A CORPORATION OF NEW JERSEY.

CAP-MAKING MACHINE.

Application filed October 27, 1926. Serial No. 144,505.

This invention relates more especially to machines for making bottle caps or other articles of a similar nature from blanks cut from card board or other suitable material.

The primary object of my invention is to provide a high speed machine of improved construction whereby a quantity production may be simply, effectively, and economically maintained.

My invention contemplates in a general way an automatic continuously operating machine of improved construction whereby blanks are fed separately from bulk thru a moistening fountain and presented between forming dies wherein said blanks are subjected to heat and pressure during the movement of said dies from the point at which they receive the blanks to the point at which they eject the formed caps and whereby the completely formed caps are subjected to a paraffining operation and finally charged into a stacking container.

The general object of my invention is to provide mechanisms of improved construction for presenting and registering blanks with respect to the cap-forming dies, for performing preliminary and final pressure operations upon said blanks within said dies and for maintaining said dies under pressure during an extended portion of their travel; for heating said dies; for opening the dies and ejecting the completely-formed caps to be conveyed to a paraffine bath; for removing the paraffined caps from the bath and conveying them at slow speed thru a drying chamber; and finally for charging the finished caps into suitable containers which may be removed and used as packaging cartons.

One of the objects of my invention is to provide mechanism of improved construction for moistening cap-blanks and squeezing therefrom excess moisture prior to depositing them in suitable cap-forming dies.

Another object of invention is to provide mechanism of improved construction for conveying moistened cap-blanks from the moistening mechanism and charging them into the cap-forming dies.

Various specific objects of invention will appear in the specification and be pointed out in the appended claims, reference being had to the accompanying drawings which exemplify my invention in an adaptation to a bottle-cap machine.

In the drawings,

Figure 1, is a side elevation of the rear end section of the machine;

Figure 1ª, is a side elevation of the mid-section of the machine;

Figure 1ᵇ, is a side elevation of the forward end section of the machine;

Figure 2, is a top plan view of the rear end section of the machine, parts being shown in section;

Figure 2ª, is a top plan view of parts shown in Figures 1 and 1ª;

Figure 2ᵇ, is a horizontal section on line 2ᵇ—2ᵇ of Figures 1ª and 1ᵇ;

Figure 3, is a side elevation from the other side of adjacent portions shown in Figures 1 and 1ª, parts being removed.

Figure 3ª, is a side elevation of the forward end section of the machine, parts being broken away;

Figure 4, is a vertical section on the line 4, 4 of Figure 1 parts being broken away;

Figure 5, is a vertical section on the line 5, 5 of Figure 1ª, parts being broken away;

Figure 6, is an enlarged vertical section of the machine shown in the lower left hand portion of Figure 1, parts being broken away and parts shown in elevation;

Figure 7, is an enlarged vertical section of the upper end of the cap delivery conveyor and drying oven shown on the left in Figure 1;

Figure 8, is an enlarged detail vertical section on the line 8, 8 of Figure 1, parts being shown in elevation;

Figure 9, is an enlarged section on the line 9, 9 of Figure 6, parts being broken away and parts shown in plan.

Figure 10, is a detailed section on the line 10, 10 of Figure 9;

Figure 11, is a detailed section on the line 11, 11 of Figure 9;

Figure 12, is a detailed section on the line 12, 12 of Figure 9;

Figure 13, is a detailed end view corresponding to the line 13, 13 of Figure 6;

Figure 14, is a vertical section on an enlarged scale on the line 14, 14 of Figure 2;

Figure 15, is a plan section on the irregular line 15, 15 of Figure 14;

Figure 16, is a section on an enlarged scale on line 16, 16 of Figure 2ª;

Figure 17, is a section on an enlarged scale on the line 17, 17 of Figure 1, parts being broken away;

Figure 18, is a vertical section on the line 18, 18 of Figure 17;

Figure 19, is a vertical section on the line 19, 19 of Figure 17;

Figure 20, is a side elevation on an enlarged scale of portions of the cap delivery mechanism shown in the lower central portion of Figure 1, parts being shown in section;

Figure 21, is a a horizontal section on the line 21, 21 of Figure 20;

Figure 22, is an enlarged section upon the line 22, 22 of Figure 1ª;

Figure 23, is a vertical section on the line 23, 23 of Figure 27;

Figure 24, is a horizontal section on the line 24, 24 of Figure 23, parts being broken away;

Figure 25, is a fragmentary detail section corresponding to line 25, 25 of Figure 24;

Figure 26, is a plan view of one of the butterfly pressure blocks removed;

Figure 27, is an enlarged vertical section on the line 27, 27 of Figure 1ᵇ;

Figure 28, is an enlarged vertical section on an enlarged scale on the line 28, 28 of Figure 3;

Figure 29, is a side elevation on an enlarged scale of one of the cap-forming dies with its electrical connections;

Figure 30, is an enlarged section on the line 30, 30 of Figure 20;

Figure 31, is a section on the line 31, 31 of Figure 29, and

Figure 32, shows a wiring diagram.

Figure 2B:
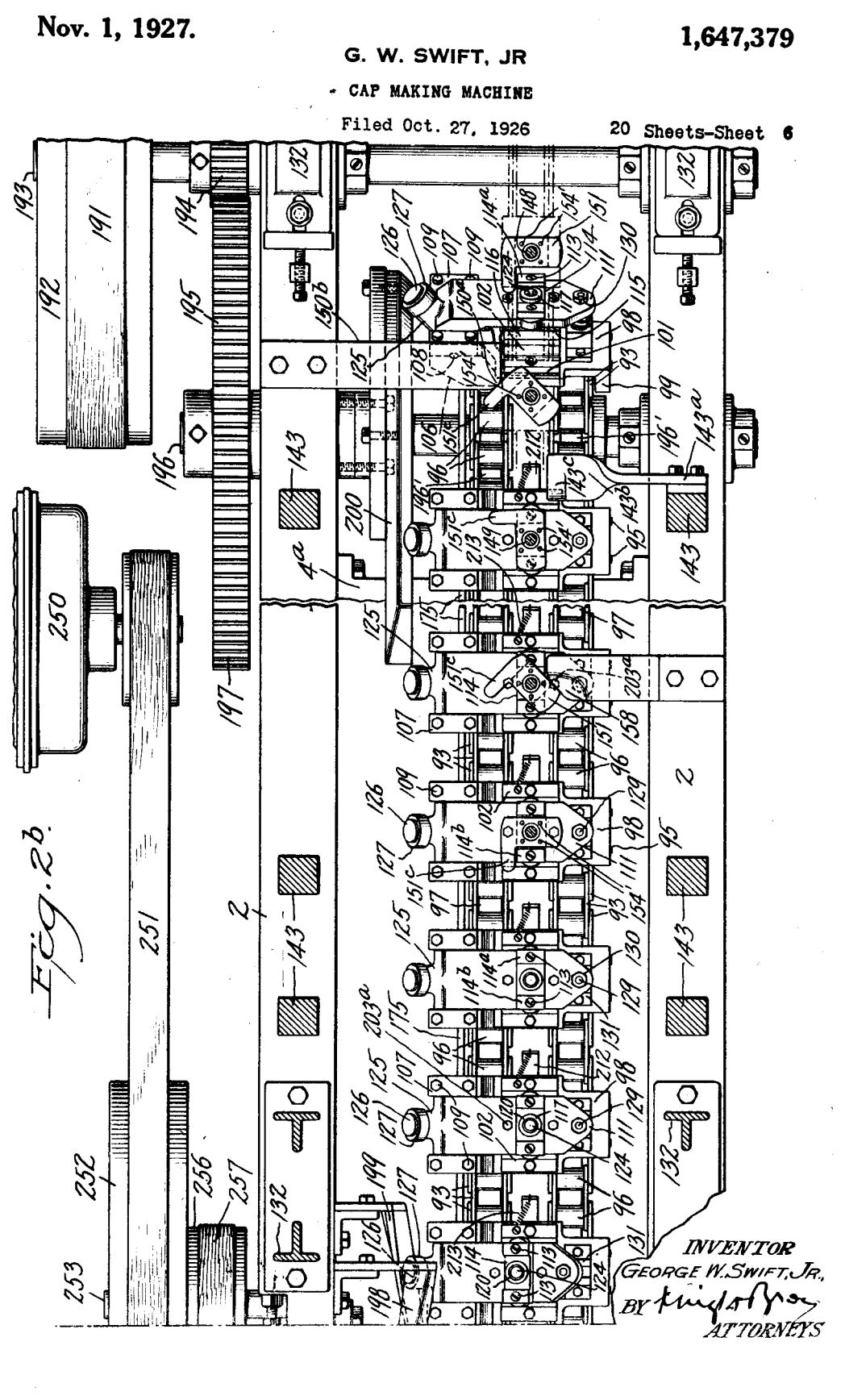

According to the preferred embodiment of my invention shown in the drawings, the main frame of the machine comprises oppositely disposed pillars or posts 1 as shown in Figures 1ª, 1ᵇ, 4, and 5, surmounted by laterally-spaced channel beams 2 which are rigidly conected at one end by a transverse beam 3 as shown in Figures 2ª, 5, and 16, at an intermediate point by a cross beam 4 shown in Figure 1ª; and at the other end by a transverse beam 4ª (see Figure 2ᵇ). Projecting rearwardly from the channel beams 2 are laterally-spaced angle bars 5 (see Figures 1 and 2) which are secured to the frame of the machine in the manner shown in Figure 4 and are supported near their outer ends by uprights 6.

*Hopper and blank-feeding mechanism.*

Referring more especially to Figures 1, 2, and 14, pairs of laterally spaced standards 35 are mounted on side-bars 5 and carry angle bars 7. Mounted upon angle bars 7 are transverse bars 8 which carry a transversely arranged base plate 9. Bolted to the plate 9, are the outwardly-presented flanges 10 of hopper supporting brackets 11 having a top plate 12 provided with a longitudinal slot 13 which accommodates an operating connection for a blank-feeding slide presently to be referred to. Spaced from but bolted to the top plate 12 is a base plate 14 of a tubular bracket 15 provided with a vertical slot 16. A tubular hopper 17 mounted in the tubular bracket 15, is provided with a vertical slot 18, said slots permitting an observer to ascertain whether or not there are cap-forming blanks in said hopper. A reciprocable slide 19 which operates across the lower end of hopper 17, is provided with a depending arm 19′ connected by a link 19″ to one end of a lever 20, said lever being pivotally mounted on a pin 21. The other arm of said lever is connected by a rod 22 to a crank pin 23 carried by a disk 24, said disk being rigidly mounted upon a rotary shaft 25 journalled in bearings 26. The power connections for driving rotary shaft 25 will be hereinafter described. It will be understood from an inspection of Figure 14 that the slide 19 is adapted to displace the blanks one at a time from the bottom of hopper 17 into the bite of upper and lower corrugated feed rolls 27 and 28 which in turn deliver them to an endless conveyor for moving said blanks thru a water bath preparatory to their delivery to the cap-forming dies. As shown in Figures 1, 2, and 15, the corrugated rolls 27 and 28 are mounted on upper and lower shafts 29 and 30 respectively said shafts being journalled in parallel bearing plates 31. Said shafts are geared together by means of a spur gear 32 keyed to the upper shaft 29 and a spur gear 32ª which meshes therewith and is keyed to the lower shaft 30. The shaft 30 is driven from power shaft 25 thru a large spur gear 33 keyed to shaft 25 and meshing with an idler gear 34 which drives the spur gear 32ª and with it the shaft 30.

*Blank-moistening conveyor.*

Mounted on the oppositely arranged sidebars 5 are pairs of laterally-spaced standards 35. Journalled on fixed axes in the lower ends of standards 35 are conveyor shafts 36 and 37, the latter receiving power in the manner to be hereinafter pointed out. Adjacent the upper ends of the standards 35 are journalled vertically-adjustable conveyor shafts 38. Keyed to each of said shafts 36, 37, 38, 38, are laterally-spaced conveyor sprocket-wheels 39 over which runs an endless conveyor comprising a plurality of articulately connected sets of grippers. Referring now to Figures 8 and 14, it will be seen that each set of grippers comprises relatively-movable gripper-frames which are pivotally connected by rods or pintles which serve at the same time to pivotally connect the successive sets of grippers in series. For this purpose, one of said gripper-frames comprises a flat transversely-arranged strip 40 with oppositely presented pairs of lugs 41 and 42 suitably disposed to permit the forwardly-presented lugs on one gripper-frame to overlap the rearwardly disposed lugs of the corresponding gripper-frame of the next set. Projecting at right angles at one end of strip 40 is a gripper-finger 43 while at the other end thereof is a radial abutment arm 44. Successive gripper-frames of this character are pivotally connected together by a transverse pintle or rod 45, the opposite ends of each pintle being extended beyond the ends of said gripper-frames and thus adapted to fit into the peripheries of conveyor sprockets 39. Pivotally suspended from each of the pintles 45, is a second gripper-frame comprising a flat transverse plate or strip 46 provided at opposite ends with bearing lugs 47 which fit between and in alinement with the forwardly-presented lugs 42. Extending from one end of the plate or strip 46 and at right angles thereto is a curved gripper finger 48 with its outer extremity deflected toward the gripper-finger 43, the latter being provided with a gripper-pad 43ᵃ against which the end of gripper-finger 48 is adapted to press. A radial abutment arm 49 at the other end of plate 46 is oppositely arranged with respect to radial arm 44 of the other gripper. Gripper-fingers 43 and 48 are subject to a coil spring 49' carried by the pintle rod 45, the opposite ends of said coil spring operating upon the respective grippers under a yieldable pressure tending to hold said gripper-fingers closed. Integral with the plate or strip 46 and deflected somewhat toward the rear, is a cam-arm 50 which, as shown in Figure 14 is adapted to be engaged by a fixed cam-block 51 for separating the grippers 43 and 48 when they reach suitable positions to receive a blank from the feed rolls 27 and 28. As shown in Figures 3, 14, and 15, vertically-arranged channel guides 45ᵃ for the oppositely-presented ends of pintles 45, are disposed with their upper ends above the plane of movement of cap-forming blanks passing between feed-rolls 27 and 28 and extend downwardly toward the water-bath to be presently referred to. Said channel-guides 45ᵃ are carried by angle bars 45ᵇ which are bolted at their lower ends to side bars 7. As shown best in Figure 15, a blank thus delivered, is confined between yieldably-mounted guide walls 52 which pivot on axes 53 for this purpose. According to Figure 14 after the grippers have closed upon the blanks, they move downwardly and around the rotary axis of the lower conveyor-sprocket wheels of the left hand standards according to Figure 1. This movement operates to immerse the blanks in a water-bath 54 contained in an elongated tank 55 which as shown in Figure 8, is suspended from one of the longitudinal bars 7 by means of depending strap hangers 56. During the forward movement of the grippers thru the moistening tank, the lower horizontal run of the gripper conveyor is supported by the oppositely-presented ends of the pintles 45 which are slidably supported by laterally-spaced longitudinal rails 57 (see Figure 8), the extremities of said pintles being confined between plates or flanges 58 which are bolted to said rails. Suitable means for supporting the rails 57, may be provided by vertical bars 57ᵃ which are bolted at their upper ends to side bars 7 and have their lower ends bolted to the rails 57 thru interposed spacing blocks 57ᵇ. As shown in Figures 14 and 15, cam 51 is carried by a vertical bar 51ᵃ which is bolted at its lower end to a bracket 51ᵇ said bracket being in turn bolted to one of the standards 35.

Keyed to the outer end of rotary shaft 25 as shown in Figures 1 and 2, is a crank disk 59. A connecting rod 60 has one end pivotally connected to said crank disk by means of a crank pin 61, the other end of said connecting rod being pivotally-connected at 62 to the outer end of a swinging arm 63 carried by a rock shaft 64, said rock shaft being oscillatably mounted in forwardly-deflected bracket-arm 65 at the upper ends of the right hand standards according to Figure 1. As shown best in Figure 16, the rock shaft 64 is provided with laterally-spaced depending pusher arms 65' which during their forward movements apply a balanced pressure to the moistened blanks for moving them forwardly to the blank-charging mechanism now to be described. In order to stiffen the blank-moistening conveyor during that portion of its travel that the vibratory arms 65' propel the blanks forwardly to the blank-charging mechanism, suitable channeled guides 45ᶜ are arranged to receive the ends of pintles 45, said guides being of similar construction to those employed where the blanks are delivered to this conveyor.

*Mechanism for charging blanks into the cap-forming dies.*

According to Figure 2, the rotary shaft 25 drives the lower feed roll shaft 30 thru spur gears 33 and 34. Said shaft 30 is connected by miter gears 67 to one end of a longitudinal shaft 68, the other end of said shaft 68 being connected by miter gears 69 to a rotary shaft 70 as shown in Figure 2ᵃ. It will be clear from an inspection of Figure 16 in connection with Figures 16 and 17 that the rotary shaft 70 carries a lower feed roll 70ᵃ and a spur gear 70ᵇ which meshes with a gear 71ᵇ which is keyed to the shaft 71. An upper feed roll 71ᵃ, is carried by shaft 71 said shafts 70 and 71 being journalled in suitable bearings 72. As a moistened blank is passed forwardly between the feed rolls 70ᵃ and 71ᵃ the excess moisture is squeezed therefrom and drops on to an inclined drip-pan 72ᵃ which overhangs one end of the tank 55. Referring now to Figures 17 and 18, it will be seen that a blank which is fed forwardly by the feed rolls 70ᵃ and 71ᵃ will be delivered on to the under guides or supporting plates 73, lateral guide rails 74 being arranged along the outer edges of said supporting plates for constraining the movements of blanks to a predetermined path in alinement with the movement of the cap-forming dies at the time they are being charged.

As shown in Figures 16 and 18, two parallel sprocket-wheels shafts 75 and 76 are journalled in bearing brackets 77 and 78. Keyed to said shafts are sprocket wheels 79 and 80 over which travels an endless sprocket chain 81. At suitable intervals said sprocket chain is provided with outwardly-presented blocks or lugs 82 which during their movements over the lower run of said sprocket chain, project below the plane of movement of the moistened blanks along the supporting plates 73 and hence serve to propel said blanks forwardly after they leave the feed rolls 70ᵃ and 71ᵃ. Mounted upon the guard rails 74 at their forward ends and with their inner edges overhanging supporting plates 73, are laterally-spaced plates 74ᵃ. Secured to the under surfaces of plates 74ᵃ are blank-confining strips 74ᵇ which prevent upward displacement of the blanks as they move forwardly and are engaged by pins 90. A transverse plate or strap 74ᶜ rigidly unites the plates 74ᵃ above. Suitable feed-in mechanism for this blank conveyor may be provided as follows. Keyed to shaft 75 adjacent to the rear sprocket wheel 79, is a gnurled wheel 83 against the periphery of which bears a pressure roll 84 journalled upon a stud carried by the outer end of a lever arm 85, said lever arm being provided with a hub portion 86 secured to a rock-shaft 87. Said rock-shaft is provided with a radial arm 88 to which one end of a tension spring 88' is connected, the other end of said spring being connected to a fixed stud 89. As a blank passes beyond the reach of the lugs carried by the endless blank-conveyor, it becomes engaged by an upwardly-presented pin 90 carried by one of the cap-forming dies to be presently described. As shown in Figures 17 and 19, a sheet-metal plate 91 which is secured to the forward end of plates 74ᵃ, is provided with downwardly and forwardly inclined fingers 92 which exert a yieldable pressure on a blank as it is forced forwardly into position to drop into the cap-forming die.

Conveyor for cap-forming dies.

As shown in Figures 4 and 5, an endless conveyor for cap-forming dies, is arranged between the main side frames of the machine. Said conveyor comprises two endless chains arranged parallel to each other and comprising overlapping links 93, short pintles 94, long pintles 95, rollers 96, and a series of yokes or frames which carry the cap-forming dies to be presently described. At the forward end of said endless conveyor, a sprocket drive shaft 196 is provided with laterally-spaced driving sprockets 196' while a follower shaft 196ᵃ at the rear end of said conveyor is provided with laterally-spaced sprockets 196''. Arranged under the upper runs of the endless chains as shown in Figure 5, are a pair of track bars 97 by means of which said chains are supported thru rollers 96. Referring more especially to Figures 5 and 22, each cap-forming die-carrier comprises a flat table or plate 98 provided with depending flanges or aprons 99 and a central enlarged rib 100. As shown, clearly in Figure 27, the long pintles 95 extend thru the aprons 99 and rib 100 and carry the sprocket chain rollers 96 of the conveyor chains. Said long pintles also pivotally connect the over-lapping ends of those conveyor links which carry the die-carrying yokes or frames. Mounted upon each plate 98 and separated therefrom by a layer 101 of heat-insulating material, is a cap-forming die 102 which is adapted to receive a cap-forming blank from the blank conveyor described above. Normally included in and forming a movable part of this die, is a central disk 103 carried by a plunger 104 reciprocably mounted in said die and central rib 100. A retaining pin 105 limits the endwise displacement of said plunger 104 when actuated for ejecting a cap after the cap-forming operation has been completed.

Cap-forming device.

Referring more especially to Figure 27, the die-carrying plate 98 is provided with a bracket arm comprising a lower integral portion 106 and a cap portion 107 between which and said portion 106 is clamped a pin 108, by means of bolts 109. Freely pivoted on the pin 108, is a bearing lug 110 integral with a movable die-plate 111, said movable die-plate being provided with a central aperture 112. Secured to the die-plate 111 by means of bolts 113 is an elongated guide-plate 114 provided at opposite ends with raised pads 114ᵃ and 114ᵇ adapted to be pressed down upon by the butterfly blocks hereinafter referred to. Arranged below said die-plate 111 and separated therefrom by a layer 115 of heat-insulation, is an upper die-block 116, said guide-plate 114 and upper die-block 116 being provided with alined central apertures 116ᵃ within which is reciprocably mounted the hollow stem 117 of an outer die-stamp section provided with an outwardly-flared annular flange 118. By an inspection of Figure 23, it will be seen that the downward displacement of sleeve 117 is limited by the upper end of a groove 117ᵃ which comes into engagement with a pin-check 117ᵇ mounted in the guide plate 114. Nested within the outwardly-flared flange 118, is a die-stamp disk 119 with a solid stem 120 reciprocably mounted in the hollow stem 117. This reciprocable movement, however, is limited by a transverse pin 121 which is mounted at opposite ends in the opposite walls of hollow stem 117. Said pin 21 extends thru a diametral slot 122 in the stem 120. The upper end of stem 120 is provided with a part-spherical ball-retaining socket 123 in which is a ball-bearing 124 which comes into operation in the manner to be hereinafter pointed out in connection with the loosening up and ejection of the completely formed caps. It will be understood from this description that the movable die-block is thus provided with a composite die stamping plunger comprising a separately-movable central part and an outer part which may be actuated together with said central part. As will hereinafter be pointed out, the operation of these parts will depend upon the setting of a butterfly cam-block which is adjustable to different positions on an overhead conveyor now to be described. A cam arm 125 which is made integral with the die-plate 111, carries a stud 126 upon which is journalled a roller 127 adapted to travel over and to be displaced by a number of cam-tracks to be hereinafter described. A stud or gage 128 which is provided with a threaded shank 129 by means of which it is secured to the movable die-plate 111 by the aid of a nut 130, is adapted by engagement with a slotted block or gage 131 which is also mounted on the die carrying plate 98 to locate the movable die-member with respect to the fixed die-member. Extending around the stud 128 and interposed between the die-plate 111 and the slotted block 131, is a compression spring 130′ which tends to separate the cap-forming dies.

*Pressure-heads conveyor.*

Referring now to Figures 1ᵃ, 1ᵇ, and 5, triangular brackets 132 which are bolted to the oppositely arranged side beams 2, are provided at the top with two pairs of co-axially arranged bearings 133 and 134. Journalled within these bearings are sprocket wheel shafts 135 and 136. Keyed to these shafts are sprocket wheels 137 and 138 over which runs an endless sprocket chain 139. Extending between the shafts 135 and 136 and in supporting engagement with the rollers 140 of chain 139 in its upper run, is a track bar 141, said track bar being supported by transversely arranged angle bars 142 mounted upon suitable columns or posts 143. As shown in Figures 1ᵃ and 1ᵇ the chain 139 is provided with short and long pintles 144 and 145, the latter serving to pivotally support the laterally spaced flanges 146 of pressure-applying yokes 147. As shown best in Figures 22, 23, 24, 25, and 26, each of said yokes carries a stud 148 provided with an enlarged intermediate bearing portion 149 and an outer end-enlargement 150 which retains a butterfly pressure block 151 against axial displacement from said stud. As shown clearly in Figures 22 and 23, the end-enlargement 150 is provided with a part-spherical recess 152 to accommodate ball bearing 124 when these parts are in juxtaposition to each other. As shown in Figure 24, each of the pressure yokes 147 is provided with a threaded hole 153 which extends inwardly to the central opening in said yoke. A grub screw 154 which is threaded into the hole 153, is adapted to engage and secure the stud within each yoke. The inwardly-presented face of each yoke is provided with two part-spherical recesses 154′ into which are adapted to seat either diagonal pair of four ball-detents 155 which are in sockets 156 in the adjacent face of the butterfly block and subjected to the yieldable pressure of compression springs 157 (see Figure 25). It is obvious from this description that the butterfly blocks may be oscillated to and fro thru successive angular displacements of 90 degrees and yieldably retained in their adjusted positions by the ball-detents 155. Referring now to Figure 23 in connection with Figure 26, the latter view may be considered as an inverted plan view of the butterfly block in the position which it occupies according to Figure 23. It will be seen therefore that the butterfly block 151 is provided with a projecting end portion 151ᵃ at one end and at its other end with a projecting portion 151ᵇ which is extended laterally from the block to form a cam-arm 151ᶜ. By an inspection of Figure 2ᵇ in connection with Figures 22 and 23, it will be understood that when a butterfly block 151 is in a position transverse to the direction of its movement (as it is in the first portion of its forward travel), its depression by a track-bar presently to be described, operates to push downwardly the hollow stem 117 of the outer die-stamp section which carries with it the die-stamp disk 119. This operation produces the relative disposition of parts shown in Figure 22 which imparts a preliminary or partial formation of the cap. By referring now to Figure 2ᵇ, it will be observed that as the butterfly block progresses toward the right, the overhanging end 151ᵃ comes into engagement with a cam-bar 158 which projects inwardly from and is bolted to the neighboring side beam 2. The effect of this movement is to throw the butterfly block into position to lie lengthwise of the direction of its movement and as shown in Figure 23, into a position in which the projecting portions 151ᵃ and 151ᵇ are disposed above and bear down upon the raised portions 114ᵃ and 114ᵇ of the elongated plate 114 provided with a central aperture to accommodate the hollow stem 117 of the outer die-stamp section. This turning movement of 90 degrees causes a corresponding depression of the upper die-plate 111 which carries with it the main upper die-block 116 and thus brings the several parts into the relative disposition shown in Figure 27. In order to facilitate the turning movements of the butterfly cams 151, said blocks as shown in Figure 26 are provided with curved beveled edges 151ᵈ.

Extending between the sprocket-wheel shafts and below the lower run of the pressure-block conveyor, is a sectional track-bar 160, comprising sections 160ᵃ and 160ᵇ, said sections being centrally supported by a longitudinal series of bolts 161, which depend respectively from the horizontal flanges of the transverse angle bars and are threaded into said track-bar. Suitable means for rectifying the track-bar laterally, may be provided by oppositely arranged series of set screws 162 threaded into said flanges and impinging upon the opposite lateral edges of said track-bar.

As shown in Figures 1ᵇ and 2ᵇ, the last upright 143 on the right-hand side of the machine has bolted thereto a flat bar or plate 143ᵃ presented horizontally inward and having its inner end 143ᵇ twisted 90 degrees to lie in a horizontal plane and in the path of the lower front corners of the forwardly-moving pressure blocks carried by the lower run of the pressure block conveyor. In order to lift the pressure blocks 151 away from the upper rear corners of the cap-forming dies as they begin their downward movements around the front sprocket wheels, the inner horizontal end portion 143ᵇ of the bar or plate 143ᵃ is provided with a cam-surface 143ᶜ which imparts an upward deflection to each pressure-block as it rides thereover.

As the pressure-blocks approach the end of their forward travel, the laterally-projecting cam-arms 151ᶜ come into camming engagement with the rounded rear corner 150ᵃ of a cam-bar 150ᵇ, said cam-bar being presented inwardly from the left-hand side frame of the machine. It will be understood from this description and in connection with Figure 2ᵇ that the butterfly pressure-blocks 151 are thus returned to initial position preparatory to another sequence of operations as described.

*Punch and die heating means.*

Referring to Figures 4, 5, 22, 23, 27, 28, 29, 31, and 32, suitable means for heating the punch and die blocks of the cap-forming mechanism, may be provided as follows. According to Figure 32, a positive conductor 163 from any suitable source of power leads to the pivot 164 of a double pole switch 165, the negative conductor 166 from said source being connected to the pivot 167 of said switch. In closed position, the knife blades 168 and 169 respectively connect the positive and negative wires to switch conductors 170 and 171. Leading from the positive conductor 170 is a wire 172 connected at 173 to a conductor bar 174, said bar being connected at opposite ends to the adjacent ends of a bent contact rail 175. Said rail extends substantially parallel to the right hand portion of the cap-forming conveyor according to Figure 3. Another wire 176 leads from contact 170 to a conductor bar 177 which is connected at opposite ends to the adjacent ends of a bent rail 178. The bent rails 175 and 178 constitute an approximately continuous conductor rail extending substantially parallel to the path of each of the cap-forming devices as it is conveyed over its closed path by the cap-forming conveyor. As shown in Figure 29, a leaf spring contact 179 is connected to a terminal 180 carried by each of the cap-forming die-blocks, said brush or leaf spring contact 179 being in slidable engagement with either the rails 175 or 178 throughout its entire cycle movement. Leading from the terminal 180 is a cable 181, containing wires connected respectively to electric heating coils 182, said coils being grounded by wires 183 in a contact screw 184. The heating units 182 are substantially similar and are connected up as shown in Figure 31. Thus a connection 185 leads from the terminal 180 to each of a pair of electric heating coils 186, said coils being grounded by wires 187 in a contact screw 188. As shown in Figure 31, each of the electric heating units 186 are disposed in circular housings 189 disposed on opposite sides of the ejector plunger in the cap-forming die-block. From this description, it will be understood that as each of the cap-forming devices moves in a closed path thru successive cycles, the punch and die members thereof are continuously heated by a current passing thru wire 163, pivot 164, knife blade 168, contact 170, wire 172 (or 176), conductor bar 174 (or 177), charged rail 175 (or 178), brush 179, terminal 180, conductor 181 (or 185), heating coils 182 (or 186), contact screw 184 (or 188), into the frame of the machine, thru ground wires 190, negative contact 171, knife blade 169, pivot 167 and negative wire 166 to current source. As shown in Figure 23, relative movement between sleeve 117 and housings 189, is permitted by grooves or recesses 117ᶜ formed in the sleeve 117.

*Power drive for cap-forming and die-operating conveyors.*

Referring more especially to Figures 1ᵇ, 2ᵇ, and 3ᵃ, it will be seen that a power-driven belt 191 passes over a large pulley 192, said pulley being keyed to a transverse shaft 193 journalled in the forward ends of the oppositely-disposed side beams 2. Keyed to said shaft between the pulley 192 and the adjacent side frame, is a spur pinion 194 which meshes into and drives a large spur gear 195, the latter gear being keyed to a transverse shaft 196 which constitutes the cap-forming die conveyor drive shaft. Keyed to the drive shaft 196 are laterally-spaced sprocket wheels which propel the laterally-spaced endless chains 93 together with the cap-forming dies carried thereby. Meshing with the large spur gear 195 and driven thereby, is another large spur gear 197 which is keyed to the transverse shaft 136 which constitutes the sprocket-wheel drive shaft of the cap-forming die operating conveyor described above. It will be seen therefore that these conveyors are thus driven in unison.

*Cap-forming die cam tracks.*

Referring more especially to Figures 1, 1ᵃ, 1ᵇ, 2ᵇ, 4, 5, and 16, it will be seen that the moistened cap-blanks are delivered to the fully-opened cap-forming dies after which said dies are closed prior to the preliminary and main die-operating functions of the butterfly cam-block conveyor described above. Following these operations, the dies are retained in their closed relations and at the same time subjected to an extended heating operation prior to the ejection of the completely formed caps which are thereupon conveyed to the paraffining bath preparatory to being stacked in a shipping container.

As the fully opened cap-forming dies move upwardly around the rear conveyor shaft 196ᵃ, the cam roller 127 comes into operating engagement with the upper and lower inclined cam-tracks 198 and 199 (see Figure 16). As shown in Figure 1ᵃ, by the time said cam-roller reaches the summit of these cam-tracks, the cap-forming dies have been closed upon the moistened blank after which the closed dies are subjected to the pressure of the butterfly cam-block corresponding thereto and carried by the overhead conveyor. As shown in Figure 1ᵃ, the lower track bar comprises a rear section 160ᵃ which serves to depress the butterfly cam-block during the preliminary cap-forming operation referred to above, the forward end of this cam-track section being spaced somewhat from the adjacent end of the other cam-track section 160ᵇ so as to relieve the pressure on the butterfly cam-block during its movement thru an angle of 90 degrees as indicated in Figure 2ᵇ. It is after this angular shift of the butterfly cam-block that it is brought into engagement with the rear end of the forward cam-track section 160ᵇ. From an inspection of Figures 1ᵃ and 1ᵇ, it will be seen that the lower edge of the forward cam-track section 160ᵇ is inclined downwardly for the purpose of gradually increasing the downward displacement of the movable die to effect the complete cap-forming movement of said dies. By referring now to Figure 2ᵇ, it will be seen that as the butterfly cam-block passes out of engagement with the upper die, the cam-roller 127 comes into engagement with a cam-track 200 which extends forwardly and downwardly around and concentric to the conveyor drive shaft 196, said cam-track terminating shortly beyond said conveyor drive shaft on the return run of the cap-die conveyor as shown in Figure 3ᵃ. At this point, the constraining pressure on the cam-roller being removed, the inverted upper cap-forming die under its own weight and pressure of compression spring 130′, tends to separate from the other cap-forming die.

Referrings to Figures 1ᵃ, 5, and 20, laterally-spaced cam-tracks 97′ extend above the lower run of the cap-forming die conveyor and operate to resist upward and lateral displacement to the said conveyor on its return run.

Cooperating with the cam-tracks 97′ for constraining the movements of the cap-forming dies toward the end of their return travel, is a track-bar 98′ which slidably engages the plate or table 98 along its outer edge and offers firm support to said plate or table while the cap is being ejected from the die. As shown in Figures 1ᵃ and 5, said track-bar 98′ is connected to one of the channel beams 2 by means of angle brackets 9″.

Extending rearwardly from a point below the conveyor drive-shaft 196 and arranged below the return run of the cap-forming conveyor, are laterally-spaced longitudinal supports 201 and 202. Mounted upon the right-hand support 201 according to Figure 28, is a guide rail 203 along which slides the head of one of the bolts 203ᵃ which secures the upper cap-forming die (now inverted) to the die-plate 111.

Referring now to Figures 3 and 3ᵃ which show the machine from the side opposite to that shown in Figures 1ᵃ and 1ᵇ, as the cap-forming dies move toward the right, the parts occupy their relative positions shown in Figure 28 with the exception that the inner or solid plunger with its disk is not raised until it nears the end of its return movement. As said dies approach the section line 28—28 as indicated in Figure 3, the ball-bearing 124 comes into engagement with the forwardly-beveled upper surface of a cam-block 204 (shown in dotted lines in Figure 3 and in fragmentary cross-section in Figure 28). As this movement takes place, the solid plunger with its disk is elevated and in the event that the formed and dried cap has adhered to the inverted upper die, lifts said cap therefrom into the position shown in Figure 28. It is at this point in its travel that cam-roller 127 passes under an upper cam-track 205 and shortly afterwards into engagement with a lower cam-track 206 which exerts a lifting effect upon said cam-roller and a corresponding downward movement to the movable die. In the lower portion of Figure 5 (a section on the line 5—5 of Figure 1ᵃ) the relative positions of the parts are shown as the movable die is approaching wide open position shown at the extreme right in Figure 20.

*Cap-ejecting mechanism.*

Referring more especially to Figures 5, 20, 29, and 30 it will be seen that the central enlarged rib 100 of the cap-forming die is provided with an inwardly-presented bifurcated lug 207 which carries a pivot 208. Oscillatably mounted on this pivot is a cam-arm 209 in the outer end of which is journalled a cam-roller 210. Intermediately of the pivot 208 and roller 210, said cam-arm is provided with a boss 211 which is continuously in engagement with the end of the stem 104 which carries the cap-forming disk of the fixed cap-forming die. As shown in Figure 30, the cam-arm 209 carries a laterally-presented pin 209ᵃ to which is connected one end of a tension spring 209ᵇ, the other end of said spring being connected to the pin 105 mounted in the upper end of plunger 104. Rigidly connected to the cam-arm 209 is a bent arm 212 to the outer end of which is connected one end of a spring 213, the other end of said spring being secured to the yoke which carries the fixed die. As the cap-forming dies approach the section line 30—30 as shown in Figure 20, the cam-roller 210 is depressed by a fixed cam-plate 214 which as shown in Figure 30 causes a downward movement of the disk 103 carried by the solid stem 104 for the purpose of ejecting the completed cap from the fixed die. In order to render this separation from the die more certain, a bent separator lever 215 has one end rigidly mounted at 216, the free outer end 215ᵃ thereof being suitably disposed to slidably contact with the fixed dies as they approach cap-ejecting position. As shown in Figure 30, this ejector arm is provided with a reduced laterally-presented flange 215ᵇ which is adapted to enter between the face of the fixed die block and the flange of the cap that is being displaced therefrom.

As shown in Figure 20, the ejected cap falls upon an endless belt 217 which passes about a guide roller 218 and over another guide roller 219. After passing through a fixed guide frame 220 which is suspended by straps 221 from the side bars 5, as shown in Figure 1, said endless conveyor passes around a drum 222, the caps being delivered one by one beneath a shield or guard 220ᵃ to an inlet guide-frame 223 at the upper end of a chute 224. Said chute is inclined downwardly for conveying caps to a paraffine bath and is provided with suitable means for controlling the passage of caps downwardly thru the chute so as to deliver them at suitably spaced intervals to a slow speed conveyor which receives the caps at its lower end beneath the surface of a paraffine bath. For this purpose, an endless conveyor 225 passes over sprocket wheels 226 and 227 carried by spindles 228 and 229. Intermediately of sprocket wheels 226 and 227, the upper run of said endless conveyor is supported by a plate or table 229ᵃ. Outwardly-presented lugs 230 on said conveyor are suitably spaced to deliver caps at predetermined intervals after said caps have been arrested in their downward movement by gravity. As shown in Figure 9, the conveyor drive-shaft 229 has a sprocket wheel 232 keyed thereto, a sprocket chain 233 being arranged to deliver power to said sprocket wheel 232 from a sprocket wheel 234 keyed to a power-driven shaft 235 upon which the drum 222 is rigidly mounted. Said drum is thus adapted to drive the cap-conveying belt 217.

As shown in Figures 9, 10, 11, and 12, the cap-chute comprises laterally-spaced upper bearings 305 for sprocket drive shaft 229, similarly spaced lower bearings 306 for sprocket shaft 228, side angle-bars 307 and 308, side bars 309, and laterally-spaced top plates 310. Attached at its upper end to side bars 309 and top plates 310, is a sheet metal yoke or frame 311 provided with laterally-spaced downwardly depressed fingers adapted to arrest a cap in its downward movement by gravity as indicated in Figure 6. By an inspection of this figure, it will be understood that a cap thus intercepted will be engaged by the next lug 230 on endless chain 225 and forced downwardly until the forward edge of said cap strikes a tilting and elevating frame 312 by which it is deflected out of the path of said lug 230 and into position to be engaged by the vanes of the endless screw conveyors now to be described.

Cap-delivery mechanism.

Referring more especially to Figures 6, 7, 9, and 13, the preferred form of cap-delivery mechanism comprises three screw or helical conveyors arranged on inclined axes. For this purpose, the bottom wall of paraffine tank 231 may be constructed with a triplex bearing 231ᵃ and a supplemental bearing frame 231ᵇ for the lower ends of three conveyor shafts 236, 237, and 238, said shafts extending on parallel axes thru said bearings and projecting downwardly and toward the right according to Figure 6. Extending upwardly and toward the left from the top edge of tank 231, is a housing comprising spaced inner and outer walls 239 and 240 surmounted by a top bearing plate 241. This plate is provided with suitable bearings for the reduced upper ends 242 of the conveyor shafts 236, 237, and 238. Intermediately of the upper and lower bearings, each of said shafts is provided with a helical screw conveyor comprising a central annular column 243 and a helical vane or web 244. From an inspection of Figure 9, it will be understood that the conveyor shafts with their annular columns are arranged on axes suitably disposed to freely admit a cap edgewise from above, said annular columns being in approximate tangential contact with the periphery of a cap delivered to said conveyors. In this position of the cap, it will be understood that the cap is suspended by means of its flange which is supported jointly by the elevating helical webs 244. Arranged below and in peripheral contact with a series of caps moving upwardly between the conveyor shafts, are cap-supporting guide rods 245. Secured to the top plate 241, is the bottom flange 246 of a hopper bracket 247, a hopper tube 248 being connected thereto and adapted to receive a detachable container 249 in coaxial alinement with a series of caps moved by the discharging conveyor.

Paraffine heater.

As shown in Figures 1 and 6, a fuel pipe 313 provided with an inlet valve 314, leads to a burner portion 315 disposed beneath the paraffine tank 231 for maintaining the paraffine in molten condition.

Cap-drying oven.

Referring now to Figures 1, 6, and 7, it will be seen that the inner shell or housing 239 constitutes an oven wall which surrounds the ascending column of paraffined caps. Extending around the shell 239 and between it and the outer shell 240, is a burner tube 316 which as shown in dotted lines in Figure 1, receives its fuel from fuel pipe 313 by means of a pipe fitting connection 317.

Cap-discharging mechanism driving connections.

Referring now to Figures 1ᵃ and 1ᵇ, an electric motor 250 is connected by an endless belt 251 to a pulley 252 keyed to a shaft 253 which as shown in Figure 6 is journalled in suitable bearings 254 carried by a post 1. Also keyed to the shaft 253 is a pulley 256 which drives a belt 257, said belt transmitting power to a pulley 258 which is keyed to a counter shaft 259. Also keyed to the shaft 259, is a spur gear 260 which meshes with a smaller spur gear 261, the last-mentioned gear being keyed to a shaft 262. As shown best in Figure 13, the shaft 262 carries a beveled pinion 263 which meshes into another beveled pinion 264, the last-mentioned pinion being keyed to conveyor shaft 236. Also keyed to shaft 236 is a spur gear 265 which meshes with a second spur gear 266 keyed to conveyor shaft 237. The spur gear 266 is in turn geared to a spur gear 270 carried by the lower end of conveyor shaft 238.

As shown in Figure 1, the power-driven shaft 262 carries a driving sprocket wheel 271 which is connected by a sprocket chain 272 to a driven sprocket 273 keyed to the shaft 235.

Guard rail for movable die.

Referring more especially to Figure 3, as the cap-forming dies approach cap-ejecting position, the movable die is moved about its pivotal axis to a position substantially at right angles to the fixed die. This movement is produced under the positive constraint of upper and lower cam-tracks which operate upon the movable die cam-roller in the manner explained above. By an inspection of Figure 3, it will be seen that the upper cam-track which constrains the movement of the movable die in a direction away from the fixed die, terminates at considerable distance short of conveyor shaft 196ᵃ. In order to prevent an overthrow of the movable die during the remainder of its return movement to blank-charging position, a guard rail 267 is rigidly connected to the left hand side frame by suitable stay-bolts 268. As shown in Figure 3, said guard rail overlaps the raised end of upper cam-tracks and extends rearwardly therefrom and upwardly around conveyor shaft 196ᵃ. As shown in Figure 3, the guard rail 267 extends forwardly and terminates above the movable die closing cam-tracks. It will be seen by an inspection of Figure 4 that said guard rail operates as a positive limit to further clockwise movement of the movable die about its pivotal axis.

*Power driven connections for the blank feeding mechanism, blank moistening conveyor, and blank-charging conveyor.*

By referring to Figures 2ª and 3, it will be seen that the rear cap-die conveyor shaft 196ª has keyed thereto at one end, a small sprocket wheel 275. This sprocket wheel drives an endless chain 276 which in turn drives a sprocket wheel 277 secured to a counter shaft 278. A spur pinion 279 which is keyed to counter shaft 278, meshes with a large spur gear 280 which is keyed to the cross-shaft 37, the last-mentioned shaft constituting the cap-moistening conveyor drive shaft as shown in Figures 3 and 16. Mounted on the opposite end of said cross-shaft 37 from that which carries the spur gear 280, is a sprocket 282 over which passes a sprocket chain 283 (see Figure 1). As shown in Figures 1, 2, 2ª, and 4, said sprocket chain 283 drives a sprocket wheel 284 keyed to the blank-feeding drive shaft 25 and is driven by sprocket wheel 284' keyed to conveyor shaft 196ª.

Referring now to Figure 4, keyed to conveyor shaft 196ª and inwardly disposed with respect to sprocket wheel 284', is a sprocket wheel 293 which drives a sprocket chain 294. As shown in Figure 1, said sprocket chain 294 passes over a slack take-up pulley 295 and around a sprocket-wheel 296, said sprocket wheel 296 being journalled upon a stud 297 which as shown in Figure 4, is mounted in an upright portion 298 of a bearing bracket. Said bracket is provided with a base plate 299 which is bolted to the side frame of the machine. Rigidly connected to the sprocket wheel 296, is a spur gear 300 which meshes with another spur gear 301 carried by the sprocket-wheel shaft 76 which drives the sprocket chain 81.

I claim:—

1. In a cap-forming machine, the combination with a conveyor provided with cap-stamping units, of a blank-moistening fountain, means for feeding blanks one by one through said fountain to said units and means for discharging formed caps from said units.

2. In a cap-forming machine, a conveyor provided with cap-stamping units, a blank-moistening fountain, means for feeding blanks one by one thru said blank-moistening fountain, means for receiving the moistened blanks from said feeding means and presenting them separately to said cap-stamping units, means for applying pressure to said units for forming said moistened blanks into caps, means for heating said cap-stamping means, and means for discharging the formed caps from said stamping units.

3. In a cap-forming machine, a conveyor provided with cap-stamping dies, means for feeding blanks to said cap-forming dies, a blank-paraffining fountain containing molten paraffine, means adapted to receive the formed caps from said cap-forming dies and to discharge them into the molten paraffine in said paraffine fountain and a conveyor having a portion thereof submerged in the molten paraffine in said paraffine fountain, the submerged portion of said conveyor being adapted and arranged to receive the formed caps one by one as they are discharged into said paraffine fountain.

4. In a cap-forming machine, the combination with a hopper for blanks, of means for moistening blanks, a cap-forming conveyor, means for separating blanks one by one from said hopper and feeding them through said moistening means to said conveyor, means for heating said blanks during the forming operation, and means for ejecting the caps from said conveyor.

5. In a cap-forming machine, a continuously movable conveyor, cap-forming means carried by said conveyor, means for feeding blanks to said cap-forming means, and a second conveyor provided with means operating upon said cap-forming means during the movement of said conveyor for forming a cap from said blank.

6. In a cap-forming machine, a hopper for blanks, a fountain for moistening said blanks relatively movable cap-forming dies, means for feeding blanks one by one from said hopper through said fountain and from said fountain to said dies, means for heating said dies during the forming operation, and means for imparting successively to said dies, a preliminary and a final pressure.

7. In a bottle-cap machine, the combination with an endless conveyor, of a series of paired movably-connected cap-forming dies mounted thereon, means for feeding blanks one by one into position between successive pairs of cooperating dies, a pressure-transmitting block movable to successive positions for transmitting preliminary and final pressures to each pair of dies, and means operated by the movement of said conveyor for moving said pressure-transmitting block into and out of said positions.

8. In a bottle-cap machine, the combination with an endless conveyor, of a series of paired cap-forming dies mounted thereon, a hopper for blanks, a blank-moistening fountain interposed between said hopper and said conveyor, means for feeding blanks from said hopper thru said fountain to said dies, means for heating said dies, and means for applying pressure to said dies during the heating operation.

9. In a bottle-cap machine, the combination with an endless conveyor, of a series of cap-forming units mounted thereon, a hopper for blanks, means for separating blanks one by one from said hopper and feeding them to successive cap-forming units, means for heating said units, and means for applying pressure to said units during the heating operation.

10. In a bottle-cap machine, the combination with a conveyor, of a series of blank-stamping units mounted on said conveyor, each of said units comprising relatively movable blank-stamping dies, means for feeding blanks to said blank-stamping units, a butterfly cam-block movable along with each of said blank-stamping units and into and out of different positions with respect thereto to transmit preliminary and final relative displacements to said dies, successive cams over which said butterfly cam-blocks are moved, and means for discharging the formed caps from said dies.

11. In a bottle-cap machine, the combination with a conveyor, of a series of blank-stamping units mounted on said conveyor, each of said units comprising relatively movable blank-stamping dies, a second conveyor, butterfly cam-blocks oscillatably mounted on said second conveyor, said conveyors having juxtaposed portions whereby successive butterfly cam-blocks are brought into operative relation to successive blank-stamping units, and cams arranged to displace said butterfly cam-blocks toward said blank-stamping units, said butterfly cam-blocks being adapted in different positions to impart graded relative displacements to said relatively-movable dies.

12. In a bottle-cap machine, the combination with a fixed blank-stamping die, of a movable blank-stamping die comprising relatively fixed and movable portions, a pressure block movable from a position in which it is adapted to transmit pressure to said movable portion alone to a position in which it is adapted to transmit pressure to both of said portions of the movable blank-stamping die, and means for applying pressure to said pressure block in each of said positions.

13. In a bottle-cap machine, the combination with a conveyor, of a series of fixed blank-stamping dies mounted thereon, co-operating blank-stamping dies movably related to said fixed dies respectively, each of the second-mentioned dies comprising relatively movable portions, with means for applying pressure to one of said portions independently of the other for imparting a preliminary blank-forming operation, and means for applying pressure to both of said portions for completing the blank-forming operation.

14. In a bottle-cap machine, the combination with a conveyor, of a series of pairs of blank-stamping dies mounted thereon, one die of each of said pairs having a relatively movable portion, and means for applying a preliminary blank-forming pressure to said relatively movable portion alone and a final pressure to said movable portion with the remainder of the die of which it constitutes a portion.

15. In a bottle-cap machine, the combination with a conveyor, of a series of blank-stamping units mounted on said conveyor, each of said units comprising pivotally connected blank-stamping dies, a cam-arm carried by one of said dies, and a cam-track extending along the path of travel of said conveyor and engaging said cam-arm for opening and closing said dies.

16. In a bottle-cap machine, the combination with a conveyor, of a series of pairs of blank-stamping dies carried by said conveyor, one of said dies in each pair being pivotally connected to the other and having a cam-arm projecting therefrom, means for feeding blanks to said blank-stamping dies, and means operating on said cam-arm to open said dies as they approach said blank-feeding means, to press said dies together for forming said blanks into caps, and to separate said dies for ejecting the formed cap.

17. In a bottle-cap machine, the combination with a conveyor, of a series of blank-stamping units mounted on said conveyor, each of said units comprising fixed and movable blank-stamping dies, said movable die being provided with a separately movable portion, means for applying pressure to said separately movable portion, means for feeding blanks to said blank-stamping units, and means for discharging the formed caps from said dies.

18. In a bottle-cap machine, the combination with a conveyor, of pairs of relatively-movable blank-stamping dies mounted on said conveyor, one of said dies of each pair being provided with a relatively movable portion, means for opening and closing said dies, and means for applying pressure to said movable portion of one of the dies under a positively increased displacement of said portion.

19. In a bottle-cap machine, the combination with a conveyor, of a series of blank-stamping dies mounted in pairs on said conveyor, one of said dies in each pair comprising relatively movable portions, means for displacing one of said portions to impart a preliminary cap-forming movement, and means for imparting a final cap-forming movement with an increasing displacement of both of said portions.

20. In a bottle-cap machine, the combination with a conveyor, of a series of blank-stamping units mounted on said conveyor, a second conveyor provided with pressure blocks adapted to apply pressure to said blank-stamping dies, a cam-track operating on the second-mentioned conveyor for imparting a preliminary cap-forming pressure to said blank-stamping units thru said pressure blocks, and a second cam-track for imparting a final cap-forming pressure under a growing displacement of said blank-stamping units.

21. In a bottle-cap machine, the combination with a conveyor, of a series of blank-stamping units mounted on said conveyor, each of said units comprising relatively movable blank-stamping dies, means for feeding blanks to said blank-stamping units, cam-tracks extending adjacent to the path of said blank-stamping units, and a cam-arm carried by one of the dies in each of said units said cam-arms being movable into and out of engagement with said cam tracks by the movement of said conveyor for opening and closing said dies.

22. In a bottle-cap machine, the combination with an endless belt conveyor, of a series of blank-stamping units mounted thereon, each of said units comprising pivotally-connected blank-stamping dies, cam-tracks arranged adjacent to oppositely directed runs of said blank-stamping units, a cam-arm carried by one of the dies in each of said units for successively engaging said cam-tracks for closing and opening said dies, means for feeding blanks to the blank-stamping units, and means for discharging the formed caps from said dies.

23. In a machine of the character described, the combination with a blank-holding hopper, of an endless conveyor, punch and die mechanism mounted on said conveyor, means for separately removing blanks from said hopper and feeding them to said punch and die mechanism, a second conveyor, means carried by the second conveyor for applying pressure to said punch and die mechanism, and means for ejecting the formed cap from said punch and die mechanism.

24. In a machine of the character described, the combination with a blank-holding hopper, of an endless conveyor, punch and die mechanism mounted on said conveyor, means for separately removing blanks from said hopper and feeding them to said punch and die mechanism, a second conveyor, means carried by the second conveyor for applying pressure to said punch and die mechanism, means for heating said punch and die mechanism, and means for ejecting the formed cap from said punch and die mechanism.

25. In a machine of the character described, the combination with a blank-holding hopper, of blank-presenting means, means for separately removing blanks from said hopper and feeding them to said presenting means, an endless conveyor, punch and die mechanism mounted on said conveyor, the former being moved by the latter into and out of position to receive blanks from said presenting means, a second conveyor, means carried by the second conveyor for applying pressure to said punch and die mechanism, and means for ejecting the formed cap from said punch and die mechanism.

26. In a machine of the character described, the combination with a blank-holding hopper, of a moistening fountain, an endless conveyor, punch and die mechanism mounted on said conveyor, means for separately removing blanks from said hopper and feeding them thru said fountain to said punch and die mechanism, a second conveyor, means carried by the second conveyor for applying pressure to said punch and die mechanism, means for heating said punch and die mechanism, and means for ejecting the formed cap from said punch and die mechanism.

27. In a machine of the character described, the combination with a blank-holding hopper, of a moistening fountain, blank-presenting means, means for separately removing blanks from said hopper and feeding them thru said fountain to said presenting means, an endless conveyor, punch and die mechanism mounted on said conveyor, the former being moved by the latter into and out of position to receive blanks from said presenting means, a second conveyor, means carried by the second coveyor for applying presure to said punch and die mechanism, and means for ejecting the formed cap from said punch and die mechanism.

28. In a machine of the character described, the combination with a blank-holding hopper, of a moistening fountain, blank-presenting means, means for separately removing blanks from said hopper and feeding them thru said fountain to said presenting means, an endless conveyor, punch and die mechanism mounted on said conveyor the former being moved by the latter into and out of position to receive blanks from said presenting means, a second conveyor, means carried by the second conveyor for applying pressure to said punch and die mechanism, means for heating said punch and die mechanism, and means for ejecting the formed cap from said punch and die mechanism.

29. In a machine of the character described, a conveyor, a stamping die presented upwardly on said conveyor, means for presenting a blank in position to be placed in said die, said means comprising a pair of laterally spaced supports under which and into close juxtaposition to which said stamping die is moved, a tongue for preventing upward displacement of a blank on said supports and lateral guides, and means carried by said die and adapted to center said blank while drawing it from said supports into said stamping die.

30. In a machine of the character described, a conveyor, a stamping die presented upwardly on said conveyor, laterally-spaced supports for presenting a blank in position to be placed in said die, and means carried by said die and adapted to center said blank while drawing it from said supports into said stamping die.

31. In a machine of the character described, an endless conveyor, a blank‑stamping die mounted thereon, means for feeding blanks to said die, a punch‑die cooperating with the first‑mentioned die, means for opening and closing said dies, a second endless conveyor having a portion of its path disposed adjacent to a portion of the path of the first‑mentioned conveyor, a pressure‑applying element mounted on the second‑mentioned conveyor for pressing said dies together, an electrically‑charged rail extending parallel to the first‑mentioned conveyor, electric heating coils carried by said dies, a contact brush carried by said dies and slidably contacting with said charged rail, said brush being electrically connected to said heating coils, and means for ejecting the formed blank.

32. In a machine of the character described, an endless conveyor, a blank‑stamping die mounted thereon, means for feeding blanks to said die, a punch‑die movable into and out of stamping relation to the first‑mentioned die, a second endless conveyor, a pressure‑applying element mounted on the second‑mentioned conveyor and moved thereby into and out of positive engagement with said punch‑die, means arranged to engage said punch‑die before said pressure applying element moves out of engagement therewith for maintaining a substantially constant pressure between said dies, a fixed track‑bar arranged to engage said punch‑die on the return run of the first‑mentioned conveyor, means for moving said punch‑die to open position after said punch‑die leaves said fixed track, and means for ejecting the formed blank.

33. In a machine of the character described, an endless conveyor, a blank‑stamping die mounted thereon, means for feeding blanks to said die, a punch‑die pivotally connected to the first‑mentioned die and having a cam‑arm projecting therefrom, a cam‑track arranged to engage said cam‑arm for closing said punch‑die on the first‑mentioned die, a second endless conveyor having a portion of its path disposed adjacent to a portion of the path of the first‑mentioned conveyor a pressure‑applying element mounted on the second‑mentioned conveyor and moved thereby into and out of positive engagement with said punch‑die, a second cam‑track arranged to engage said cam‑arm before said pressure applying element moves out of engagement with said punch‑die, and means for ejecting the formed blank.

34. In a machine of the character described, an endless conveyor, a blank‑stamping die mounted thereon, means for feeding blanks to said die, a punch‑die cooperating with the first‑mentioned die, means for opening and closing said dies, a second endless conveyor having a portion of its path disposed adjacent to a portion of the path of the first‑mentioned conveyor, a pressure‑applying element mounted on the second‑mentioned conveyor and moved thereby into and out of positive engagement with said punch‑die, a second cam‑track arranged to engage said cam arm before said pressure applying element moves out of engagement with said punch‑die, means arranged to engage said punch‑die on the return run of the first‑mentioned conveyor, means for moving said punch‑die to open position after said punch‑die leaves the last said means and means for ejecting the formed blank.

35. In a machine of the character described, an endless conveyor, a blank‑stamping die mounted thereon, means for feeding blanks to said die, a punch‑die pivotally connected to the first‑mentioned die and having a cam‑arm projecting therefrom, a cam‑track arranged to engage said cam‑arm for closing said punch‑die on the first‑mentioned die, a second endless conveyor having a portion of its path disposed adjacent to a portion of the path of the first‑mentioned conveyor, a pressure‑applying element mounted on the second‑mentioned conveyor and moved thereby into and out of positive engagement with said punch‑die, a second cam‑track arranged to engage said cam‑arm before said pressure applying element moves out of engagement with said punch‑die, a fixed track‑bar arranged to engage said punch‑die on the return run of the first‑mentioned conveyor, a cam‑track arranged to engage said cam‑arm for moving said punch‑die to open position after said punch‑die leaves said fixed track, and means for ejecting the formed blank.

36. In a machine of the character described, an endless conveyor, a blank‑stamping die mounted thereon, means for feeding blanks to said die, a punch‑die pivotally connected to the first‑mentioned die and having a cam‑arm projecting therefrom, a cam‑track arranged to engage said cam‑arm for closing said punch‑die on the first‑mentioned die, a second endless conveyor having a portion of its path disposed adjacent to a portion of the path of the first‑mentioned conveyor, a pressure‑applying element mounted on the second‑mentioned conveyor and moved thereby into and out of positive engagement with said punch‑die, a second cam‑track arranged to engage said cam‑arm before said pressure applying element moves out of engagement with said punch‑die, an electrically‑charged rail extending parallel to the first‑mentioned conveyor, means carried by said dies and slidably contacting with said charged rail for heating said dies, a fixed track-bar arranged to engage said punch-die on the return run of the first-mentioned conveyor, a cam-track arranged to engage said cam-arm for moving said punch-die to open position after said punch-die leaves said fixed track, and means for ejecting the formed blank.

37. In a machine of the character described, laterally-spaced endless chains, a yoke supported by and connecting said chains, a die-block carried by said yoke, a second die-block pivotally mounted on said yoke to cooperate with the first-mentioned die-block, cooperating blank-shaping plungers reciprocable in said die-blocks respectively, a cam-arm carried by one of said die-blocks, and a cam-track for operating said cam-arm.

38. In a machine of the character described, a conveyor, a die-supporting plate carried thereby, a die-block, an ejector reciprocably mounted in said die-block, said ejector being provided with a disk constituting a movable portion of said die, a second die-carrying plate pivotally connected to the first-mentioned plate, the second-mentioned plate being provided with a central aperture, a punch-die having a hollow shank fitting said aperture, a plunger reciprocable in said punch-die and carrying a disk constituting a portion of said die, and means for moving said punch-die-carrying plate towards and away from the other die supporting plate.

39. In a machine of the character described, an endless conveyor comprising laterally-spaced endless chains and yokes connecting said chains, each of said yokes being provided with a die-supporting plate, a die-block, an ejector carried by said die-block, said ejector being provided with a disk constituting a movable portion of said die, a second die-carrying plate movably connected to the first-mentioned plate, the second-mentioned plate being provided with a central aperture, a punch-die having a hollow shank fitting said aperture, a yieldably mounted plunger reciprocable in said punch-die and carrying a disk constituting a portion of said die, a cover plate for said aperture, and means for moving said punch-die-carrying plate towards and away from the other die supporting plate.

40. In a machine of the character described, an endless conveyor comprising laterally-spaced endless chains and yokes connecting said chains, each of said yokes being provided with a die-supporting plate, a die-block, a layer of heat-insulation interposed between said die-block and said plate, means for heating said die-block, an ejector reciprocably mounted in said die-block and yoke, said ejector being provided with a disk constituting a movable portion of said die, a second die-carrying plate pivotally connected to the first-mentioned plate, the second-mentioned plate being provided with a central aperture, a punch-die having a hollow shank fitting said aperture, means for heating said punch-die, a heat-insulating layer interposed between said punch-die and the second die-carrying plate, a plunger reciprocable in said punch-die and carrying a disk constituting a portion of said die, a cover plate for said aperture, a compression spring interposed between said cover plate and said disk, and means for moving said punch-die-carrying plate towards and away from the other die supporting plate.

41. In a machine of the character described, the combination with a conveyor provided with means for holding separated cap-blanks, of means for separately delivering cap-blanks thereto, means for moistening the separated blanks carried by said conveyor, a conveyor provided with blank-stamping dies adapted to receive moistened blanks from the first-mentioned conveyor, means for heating said blank-stamping dies, a receptacle for molten paraffine, a conveyor partly immersed in the paraffine in said receptacle, and means for receiving the heated and dried caps from said blank-stamping dies and delivering them to that part of the last-mentioned conveyor which is immersed in paraffine.

42. In a machine of the character described, the combination with a continuously-movable conveyor, of blank-forming dies carried thereby, blank-moistening means, means for conveying moistened blanks from said blank-moistening means to said blank-forming dies, a paraffine fountain, means for conveying the formed caps from said cap-forming dies to said paraffine fountain, and a conveyor for removing the paraffined caps from said paraffine fountain.

43. In a machine of the character described, the combination with continuously moving blank-stamping dies, of continuously movable means for feeding blanks to said blank-stamping dies, a paraffine fountain, a continuously movable conveyor partly immersed in the paraffine in said fountain, and means receiving the formed caps from said cap-forming dies and delivering them to the immersed portion of the last-mentioned conveyor.

44. In a machine of the character described, the combination with an endless conveyor, of cooperating dies mounted thereon, a second endless conveyor having a portion of its path arranged above a portion of the path of said co-operating dies, a pressure-applying member mounted on said second conveyor, and successive cam-tracks for imparting preliminary and complete displacements to said pressure-applying member whereby corresponding preliminary and final movements are respectively imparted to said dies.

45. In a machine of the character described, the combination with an endless conveyor, of a die-supporting plate mounted on said conveyor, a die-block mounted on said die-supporting plate, a second die-carrying plate pivotally connected to the first-mentioned plate, a second die-block mounted thereon, a second endless conveyor having a portion of its path arranged above a portion of the path of said die-blocks, and a pressure-applying member carried by said second conveyor and movable successively into positions in which it applies first a preliminary pressure to said die-blocks and then a final pressure thereto.

46. In a machine of the character described, the combination with an endless conveyor, of a die-supporting plate mounted on said conveyor, a die-block mounted on said die-supporting plate, a second die-carrying plate pivotally connected to the first mentioned plate, a second die-block mounted thereon, said second die-plate and die-block being provided with alined apertures, inner and outer die punch members reciprocable thru said apertures and relatively to each other, a second endless conveyor having a portion of its path arranged above a portion of the path of said die-blocks, and a pressure-applying member mounted on said second conveyor and movable successively into positions in which it transmits pressure to one of said die-punch members and then to both of said die-punch members.

47. In a machine of the character described, the combination with an endless conveyor, of a die-block mounted thereon a second die-block pivotally connected to the first-mentioned die-block, inner and outer die-punch members reciprocably mounted in the second die block, a second endless conveyor having a portion of its path arranged above a portion of the path of said die-blocks, and a pressure-applying member mounted on said second conveyor and movable into and out of position to apply pressure to said die-punch members.

48. In a machine of the character described, the combination with a hopper for blanks, of means for feeding blanks from said hopper, a water fountain arranged below the plane in which blanks are fed from said hopper by said blank-feeding means, an endless conveyor receiving blanks from said blank-feeding means and conveying them thru said water fountain, a cap-forming conveyor, and means for conveying moistened blanks from the first-mentioned conveyor to the cap-forming conveyor.

49. In a machine of the character described, the combination with a hopper for blanks, of a water fountain, an endless blank-conveyor having a portion of its path suitably disposed to convey cap-blanks thru said water fountain, means for feeding blanks from said hopper to said endless blank-conveyor, means for shaping said blanks to form caps therefrom, and a conveyor receiving the moistened blanks from said endless blank-conveyor and delivering them to said blank-shaping means.

50. In a machine of the character described, the combination with a water fountain, of an endless blank-conveyor having a portion of its path suitably disposed to convey cap-blanks thru said water fountain, means for shaping said blanks to form caps therefrom, a conveyor receiving the moistened blanks from said endless conveyor and delivering them to said blank-shaping means, and means for heating said moistened blanks during the cap-shaping operation.

51. In a machine of the character described, the combination with a hopper for blanks, of means for feeding blanks from said hopper, means for moistening said blanks, a conveyor, means for receiving blanks from said blank-feeding means and conveying the moistened blanks to said blank-forming dies, electric heating coils carried by said dies, an electric conducting rail extending parallel to the path of said dies, and an electric circuit including said rail and heating coils and a contact brush slidably engaging said conducting rail.

52. In a machine of the character described, the combination with a conveyor, of cap-forming dies mounted on said conveyor, a second conveyor, pressure-transmitting blocks carried by said second conveyor for imparting the cap-forming movements to said cap-forming dies, a cam-track operating upon said second conveyor for imparting a preliminary cap-forming displacement to said pressure blocks, and a second cam-track operating upon said second conveyor for imparting a final cap-forming displacement to said pressure blocks.

53. In a machine of the character described, the combination with a conveyor, of means for driving said conveyor, cap-forming dies mounted on said conveyor, one of said dies being provided with a separately movable portion for imparting a preliminary cap-forming impression, a second conveyor, for imparting the relative cap-forming movements to said dies, pressure-transmitting blocks carried by the second conveyor, each of said blocks being movable relatively to said second conveyor from a position in which it actuates said separately-movable portion to a position in which it actuates the entire die, a cam-track operating upon said second conveyor for imparting the preliminary cap-forming impression, and a second cam-track operating upon said second conveyor for imparting the final cap-forming impression.

54. In a machine of the character described, the combination with an endless conveyor, of means for continuously driving said conveyor, fixed and movable cap-forming dies mounted on said conveyor, said movable die comprising relatively fixed and movable portions, a continuously driven conveyor for imparting the cap-forming movements to said movable die, pressure-transmitting blocks movably connected to the second conveyor, each of said blocks being movable from a position in which it is adapted to operate said movable portion alone to a position in which it is adapted to operate said fixed and movable portions together, cam-tracks arranged to operate in succession upon said second conveyor, and means for moving said pressure block from one position to the other as it passes from one cam-track to the other.

55. In a machine of the character described, the combination with an endless conveyor, of fixed and movable cap-forming dies mounted thereon, a second endless conveyor, a pressure-transmitting block carried by the second-mentioned conveyor and mounted to swing about an axis transverse to its path, means arranged along the path of said block for moving it to and fro between positions respectively corresponding to preliminary and final cap-forming movements of said movable die, a cam-track operating upon said second conveyor during the preliminary cap-forming movement, and a second cam-track operating upon said second conveyor during the final cap-forming movement.

56. In a machine of the character described, the combination with an endless conveyor, of means for continuously driving said conveyor, relatively movable cap-forming dies mounted on said conveyor, a continuously driven conveyor for imparting the relative cap-forming movements to said dies, pressure-transmitting blocks carried by the second-mentioned conveyor for respectively engaging successive units of cap-forming dies on the first-mentioned conveyor, a cam-track operating upon said second-mentioned conveyor for imparting a preliminary cap-forming displacement to said pressure-blocks, and a second cam-track operating upon said second-mentioned conveyor for imparting a final gradually increased cap-forming displacement to said pressure-blocks.

57. In a machine of the character described, the combination with an endless conveyor, of fixed and movable cap-forming dies mounted on said conveyor, a second endless conveyor, pressure-transmitting blocks carried by the second-mentioned conveyor, said pressure-transmitting blocks being movable about axes normal to their path of travel and adapted in one position to impart a preliminary cap-forming movement and in another position to impart a final cap-forming movement, a cam-track operating upon said second conveyor for imparting the preliminary cap-forming movements to said pressure-blocks, a second cam-track operating upon said second conveyor for imparting the final cap-forming movement to said pressure-blocks and means for moving said pressure-blocks from one position to the other.

58. In a machine of the character described, the combination with a conveyor, of fixed and movable cap-forming dies mounted on said conveyor, a reciprocable stem mounted in said movable die and provided with a disk constituting a portion of said movable die, a second conveyor, a pressure-transmitting block movable on the second conveyor between positions corresponding to preliminary and final cap-forming operations, cam-tracks operating upon said stem and movable die in succession thru the interposed pressure blocks, and means for moving said pressure blocks between positions corresponding to the preliminary and final cap-forming operations.

59. In a machine of the character described, the combination with an endless conveyor, of means for continuously driving said conveyor, relatively movable cap-forming dies mounted on said conveyor, a continuously driven conveyor for imparting the relative cap-forming movements to said dies, pressure-transmitting blocks carried by the second-mentioned conveyor for respectively engaging successive units of cap-forming dies on the first-mentioned conveyor, a cam-track operating upon said second-mentioned conveyor for imparting a preliminary cap-forming displacement to said pressure-blocks, and a second cam-track operating upon said second-mentioned conveyor for imparting a final cap-forming displacement to said pressure-blocks, said pressure-blocks being movable about axes normal to their path of travel and adapted in one position to displace only a portion of one of the movable dies and in another position to displace said die in its entirety.

60. In a machine of the character described, the combination with a blank-feeding hopper, of blank-moistening means, means operating upon said blanks to shape them into caps, means for receiving said blanks singly from said hopper and conveying them separately to said blank-moistening and blank-shaping means, means for heating said blank-shaping means, means for paraffining the formed caps, and means for heating the paraffined caps.

61. In a machine of the character described, the combination with means for feeding blanks singly from bulk, of means for shaping said blanks to form caps therefrom, a conveyor receiving the blanks from said feeding means and delivering them to said blank-shaping means, means for paraffining said formed caps, means for conveying the formed caps from said cap-shaping means to said paraffining means, means for conveying the paraffined caps from said paraffining means, and an oven surrounding the last-mentioned conveying means for heating the paraffined caps.

62. In a machine of the character described, the combination with continuously moving blank-stamping dies, of a continuously moving blank-moistening conveyor, means for feeding caps singly to said blank-moistening conveyor, a blank-moistening fountain thru which the separated cap-blanks are conveyed by the last-mentioned conveyor, means for receiving moistened blanks from said blank-moistening conveyor and delivering them to said blank-stamping dies, and means for operating said dies to form blanks into caps.

63. In a machine of the character described, the combination with a paraffine fountain, of means for conveying articles to said paraffine fountain, a conveyor for lifting the articles from said fountain, said conveyor having its cap-receiving end submerged in said paraffine fountain, and a drying oven surrounding the last-mentioned conveyor.

64. In a cap-forming machine, the combination with a traveling conveyor, of relatively fixed and movable stamping dies carried by said conveyor, one of said dies being provided with relatively-movable portions, a pressure-block movable into and out of different positions respectively adapting it to transmit pressure to one or both of said relatively-movable portions, means for applying a preliminary pressure to said pressure-block in one of said positions, and means for applying a final pressure to said pressure-block in the other of its positions.

65. In a machine of the character described, a conveyor, a pair of stamping dies mounted on said conveyor, one of said stamping dies comprising relatively-movable portions, a second conveyor, a pressure-block movably mounted on said second conveyor and movable thereby into successive positions adapting it to apply a preliminary stamping pressure to one of said relatively-movable portions and a final pressure to both of said portions, and means for applying pressure to said second conveyor adjacent to said pressure block during its movements past said positions.

66. A cap-forming die mechanism comprising relatively-movable die-blocks provided with fixed cooperating portions of the cap-shaping dies carried by said die-blocks, an ejector reciprocably mounted in one of said die-blocks and constituting a movable portion of the cap-shaping die carried by the die-block within which it is mounted, an outer movable cap-shaping die-section provided with a hollow stem reciprocably mounted in the other of said die-blocks, and an inner movable cap-shaping die-section provided with a stem reciprocably mounted in the hollow stem of the outer movable cap-shaping die-section, and means whereby a preliminary cap-shaping pressure is applied to said outer and inner movable cap-shaping die-sections independently of the die-block by which they are carried and a final cap-shaping pressure to said die-block and outer and inner cap-shaping die-sections together.

67. In a machine of the character described, the combination with an endless conveyor comprising upper and lower horizontal runs, of cap-forming dies mounted on said endless conveyor, means for delivering cap-blanks to the cap-forming dies on their upper run, means for imparting a cap-shaping pressure to said cap-forming dies during their upper run, means for ejecting the formed caps from said dies during their lower run, a receptacle for molten paraffine, a conveyor having a portion thereof submerged in the molten paraffine in said receptacle for removing paraffined caps therefrom, a cap-feeding conveyor adapted to deliver formed caps to the submerged portion of the paraffined cap-conveyor, and a conveyor suitably arranged to receive the formed caps ejected from said cap-forming dies and to deliver them to said cap-feeding conveyor.

68. In a machine of the character described, the combination with an endless conveyor rotatably supported on parallel horizontal axes to provide upper and lower horizontal runs therefor, of cap-forming dies mounted on said endless conveyor, means for delivering cap-blanks to said cap-forming dies on their upper run, means for imparting pressure to said cap-forming dies, means for ejecting the formed caps from said dies traveling over the lower run of said conveyor, a receptacle for molten paraffine, a conveyor having a portion thereof submerged in the molten paraffine in said receptacle for removing paraffined caps therefrom, and means for receiving the formed caps as they are discharged from said cap-forming dies and for conveying said caps to the submerged portion of said paraffined cap conveyor.

GEORGE W. SWIFT, Jr.